United States Patent [19]
Hirano et al.

[11] Patent Number: 4,962,664
[45] Date of Patent: Oct. 16, 1990

[54] ROLLER CLAMP TYPE WHEEL EXAMINING APPARATUS

[75] Inventors: Akira Hirano, Hidaka; Shinichi Watanabe, Sayama; Yutaka Fukuda, Tokorozawa; Yukio Higuchi, Fuji; Fumio Shibano, Sakado; Hiroshi Sekino, Tokyo; Hiroichi Nabeshima, Hidaka; Yukimasa Nishizawa, Iruma, all of Japan

[73] Assignees: Honda Giken Kogyo Kabushiki Kaisha; Anzen Motor Car Co., Ltd., both of Tokyo, Japan

[21] Appl. No.: 335,321

[22] Filed: Apr. 7, 1989

Related U.S. Application Data

[62] Division of Ser. No. 196,208, May 19, 1988, Pat. No. 4,901,560.

[30] Foreign Application Priority Data

| May 20, 1987 | [JP] | Japan | 62-121127 |
| May 20, 1987 | [JP] | Japan | 62-121128 |
| May 20, 1987 | [JP] | Japan | 62-121129 |
| May 20, 1987 | [JP] | Japan | 62-121130 |
| May 20, 1987 | [JP] | Japan | 62-121126 |
| Sep. 14, 1987 | [JP] | Japan | 62-228247 |
| Sep. 14, 1987 | [JP] | Japan | 62-228248 |
| Sep. 14, 1987 | [JP] | Japan | 62-228249 |
| Sep. 14, 1987 | [JP] | Japan | 62-228250 |

[51] Int. Cl.[5] .......................................... G01M 19/00
[52] U.S. Cl. ................................. 73/118.1; 33/203.13
[58] Field of Search ............... 33/203.12, 203.13, 1 N; 73/118.1; 74/409

[56] References Cited

U.S. PATENT DOCUMENTS

| 2,108,383 | 2/1938 | Morse | 33/203.12 |
| 2,397,777 | 4/1946 | Colman | 74/409 |
| 3,546,782 | 12/1970 | Pereue et al. | 33/203.13 |
| 3,828,622 | 8/1974 | Neff | 74/409 |
| 4,567,667 | 2/1986 | Minagawa et al. | 33/203.12 |
| 4,631,832 | 12/1986 | Schrammen et al. | 33/203.12 X |

Primary Examiner—Jerry W. Myracle
Attorney, Agent, or Firm—Skjerven, Morrill, MacPherson, Franklin & Friel

[57] ABSTRACT

A roller clamp type wheel examining apparatus includes a support for supporting thereon a wheel of a vehicle to be examined, a plurality of rollers for clamping the wheel supported on the support from both sides thereof and an angle detector for detecting the angle of orientation of the wheel when clamped by the plurality of rollers. The wheel of a vehicle clamped by the rollers on both sides thereof may be driven to rotate around its own rotating axis to thereby examine dynamic characteristics of the wheel. In this case, the support structure should, for example, include a pair of support rollers for supporting thereon the wheel to be examined in a rotatable manner. The support may include a floating table having a flat top support surface and movable in a horizontal plane translationally as well as rotationally, in which case only the dynamic characteristics of the wheel may be examined since the wheel is not rotatable around its rotating axis.

16 Claims, 29 Drawing Sheets

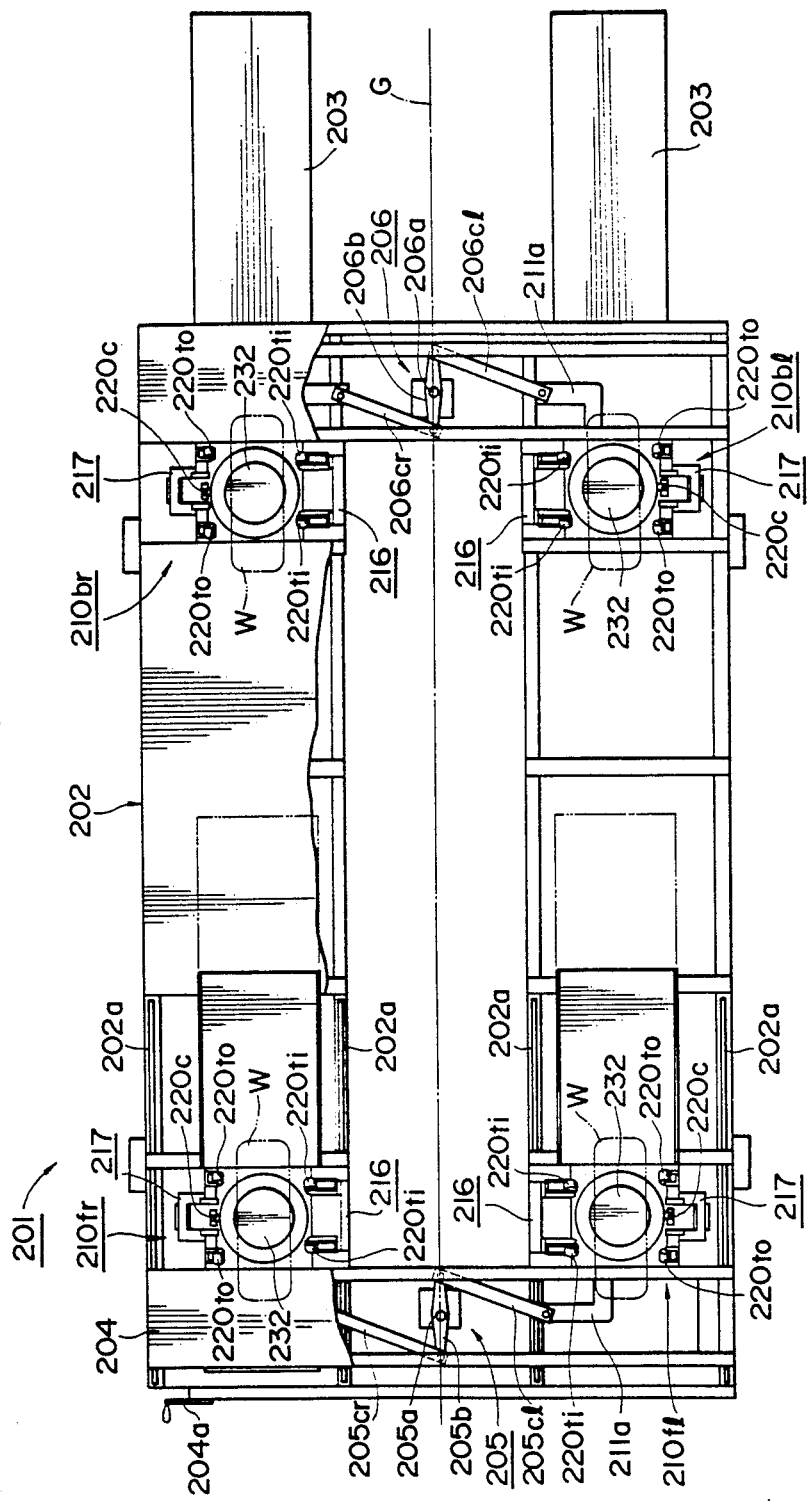

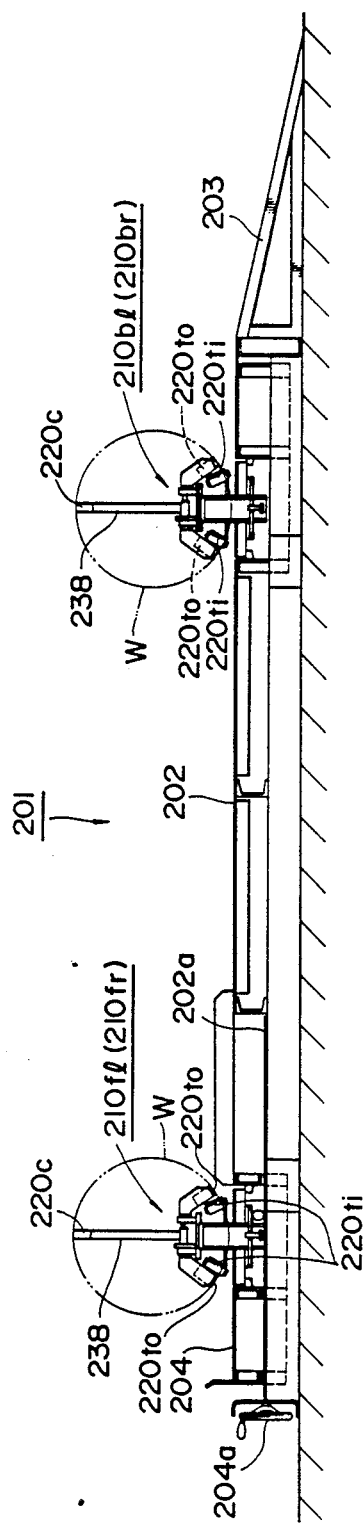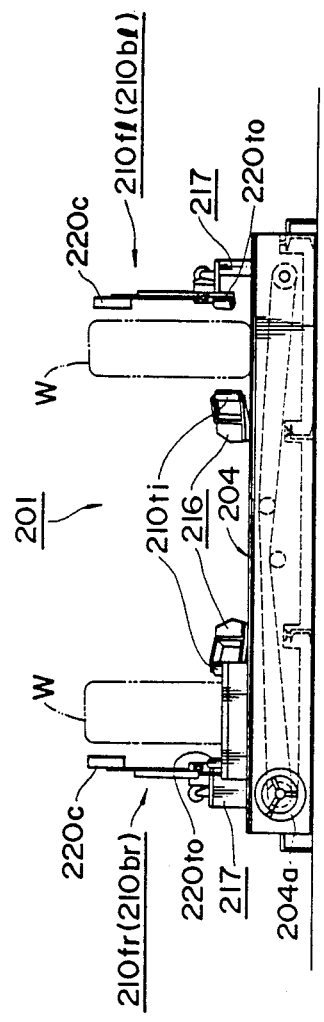

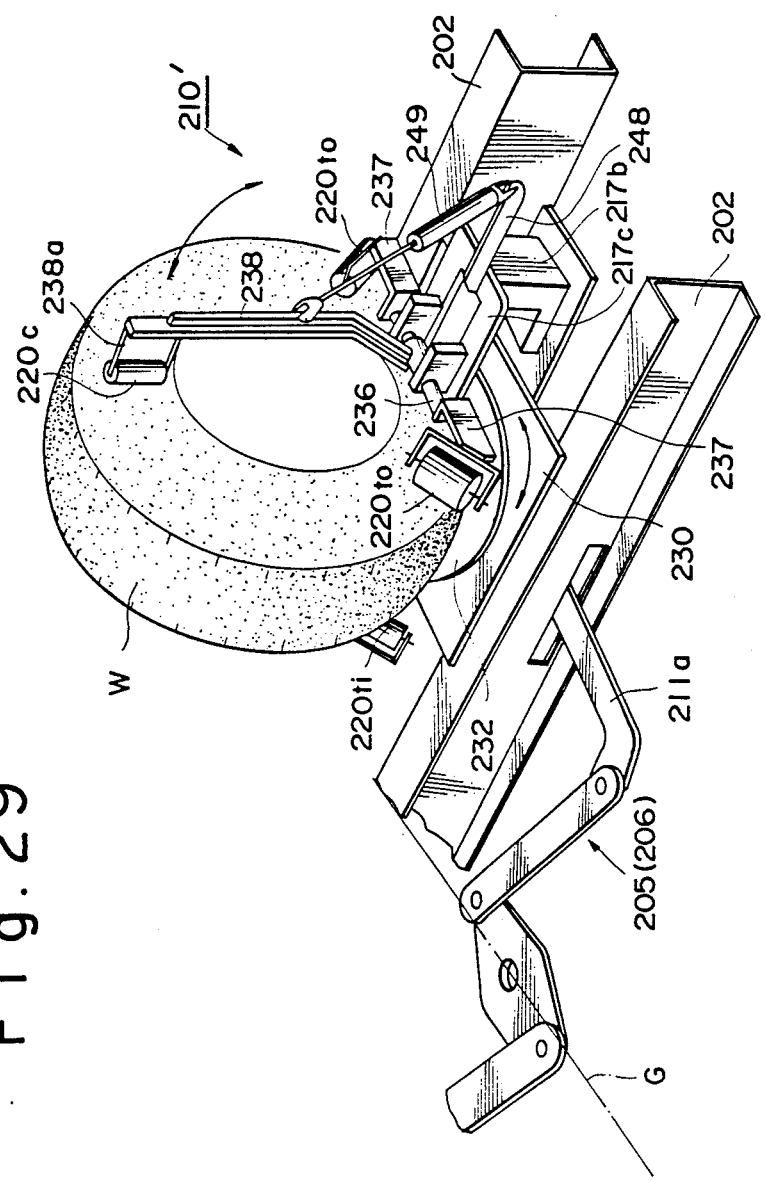

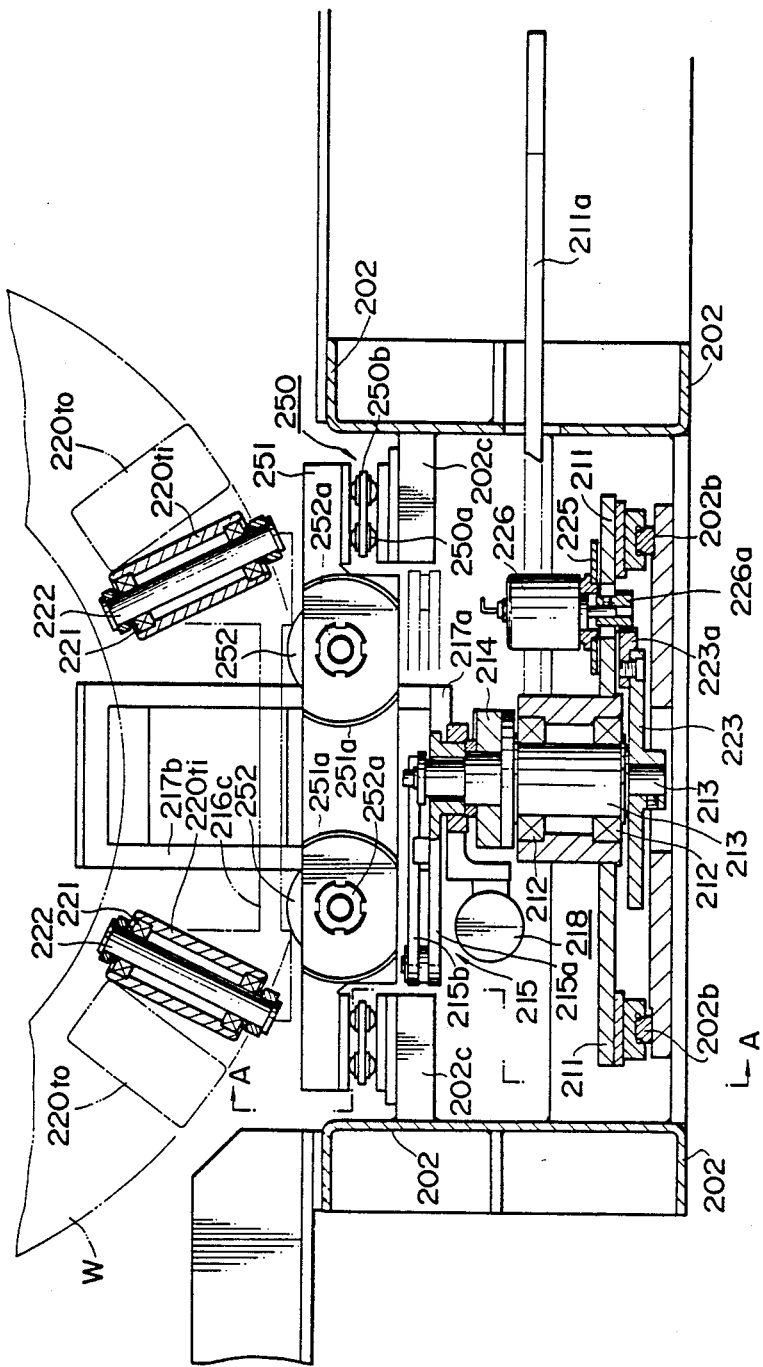

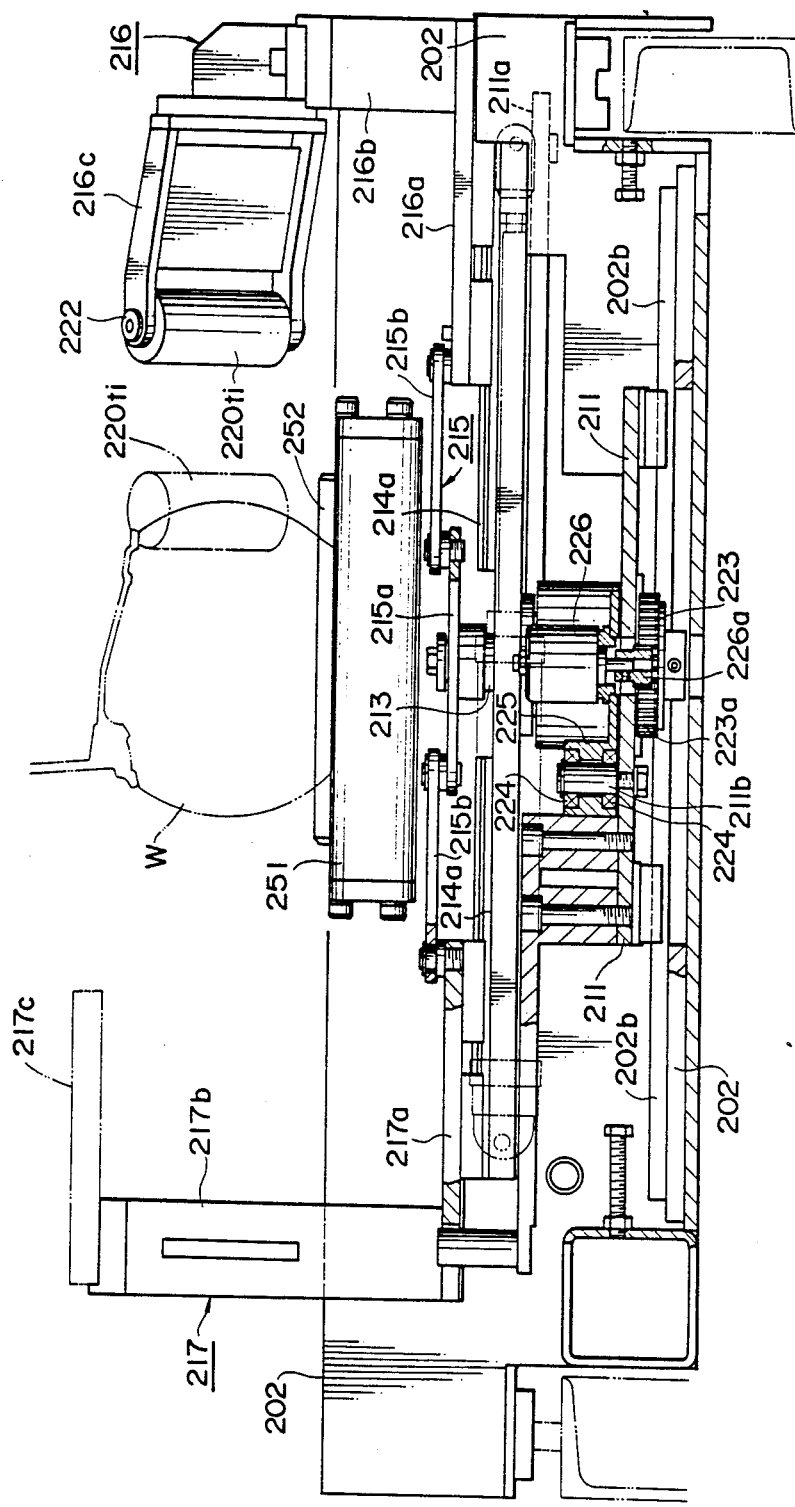

ROLLER CLAMP TYPE WHEEL EXAMINING APPARATUS

This application is a division of application Ser. No. 07/196,208, filed May 19, 1988, now U.S. Pat. No. 4,901,560.

BACKGROUND OF THE INVENTION

1. Field of the Invention

This invention generally relates to an apparatus for examining a wheel of a vehicle, and in particular to a wheel alignment examining apparatus using rollers to clamp a wheel. More specifically, the present invention relates to a wheel alignment examining apparatus capable of examining alignment and/or performance of a wheel statically and/or dynamically.

2. Description of the Prior Art

A wheel alignment examining apparatus for examining the mounting condition of a wheel of a vehicle, such as an automobile, is well known in the art. Various parameters are set for a wheel mounted on a vehicle, such as an automobile, and they include the so-called wheel inclination parameters, such as toe, camber and caster, in relation to running performance. These wheel inclination parameters are checked before a vehicle is sent to a market upon its completion, and they are also checked after repair of a vehicle, such as replacement of wheels. In order for a vehicle to have an excellent running performance, it is important that such wheel inclination parameters be set and maintained at proper values. In addition, the dynamic performance of a wheel, i.e., the performance while a wheel is in rotation, includes such parameters as the amplitude of wiggling of a wheel and the steered angle of a wheel, and since the running performance of a vehicle is also significantly affected by such a dynamic performance, it is also important to be able to examine the dynamic performance of a wheel at high accuracy.

The prior art approaches for measuring the toe and/or camber of a wheel while maintaining the wheel in rotation are disclosed in Japanese Patent Laid-open Publications, Nos. 51-83301 and 54-49701. In accordance with these prior art approaches, a wheel to be examined is supported on a pair of rollers for rotation; however, the wheel to be examined is either not supported at its side surfaces, or a contact roller is brought into rolling contact with one side surface of the wheel. In accordance with these prior art approaches, since a wheel to be examined is not clamped at opposite side surfaces, the geometrical center of the wheel is not determined and thus it is difficult to carry out an accurate measurement.

Japanese Patent Applications Nos. 58-109235 and 59-9502 and Japanese Patent Laid-open Publication No. 61-41913, assigned to the assignees of the present application, disclose a technique for determining the geometrial center of a wheel supported on a floating table by holding the wheel from both side surfaces thereof. However, in accordance with this approach, since the wheel to be examined is supported on a table, the wheel cannot be rotated so that only the static performance can be measured. More importantly, these prior applications only teach to clamp a wheel from both sides using a slider which comes into a surface contact with one side surface of the wheel.

As set forth above, none of the prior art allows to measure both of the dynamic and static performances of a wheel as being mounted on a vehicle completely. Under the circumstances, there has been a need to develop a more perfected apparatus for examining a wheel of a vehicle.

SUMMARY OF THE INVENTION

In accordance with one aspect of the present invention, there is provided a wheel examining apparatus which allows to measure desired parameters of a wheel accurately while keeping the wheel in rotation with its geometrical center determined. That is, in one form, the present wheel examining apparatus includes supporting means for rotatably supporting a wheel of a vehicle; driving means for driving to rotate the wheel supported on said supporting means by moving said supporting means in a desired direction; positioning means for positioning the geometrical center of said wheel by rotatably clamping said wheel from both side surfaces thereof; and detecting means for detecting a predetermined performance of said wheel supported on said supporting means. In the preferred embodiment of this aspect of the present invention, the supporting means includes a pair of support rollers arranged in parallel, and the positioning means includes contact rollers located on both sides of the wheel so as to be separated away from and brought into rolling contact with the opposite surfaces of the wheel.

In accordance with another aspect of the present invention, there is provided a rotating wheel examining apparatus for examining each wheel of a vehicle, which comprises: supporting means for rotatably supporting a wheel at its bottom; positioning means for positioning the geometrical center of the wheel by rotatably clamping both side surfaces of the wheel; and detecting means for detecting a desired performance of the wheel supported on said supporting means. In the preferred embodiment of this aspect of the present invention, the supporting means includes a pair of support rollers arranged in parallel, and the positioning means includes contact rollers located on both sides of the wheel so as to be separated away from and brought into rolling contact with the opposite surfaces of the wheel.

In accordance with a further aspect of the present invention, there is provided a wheel examination system for examining each wheel of a 4-wheel vehicle, comprising: first and second pairs of wheel examining units for front and rear wheels of said 4-wheel vehicle, respectively, each of which includes supporting means for rotatably supporting the corresponding one of the four wheels of said 4-wheel vehicle at its bottom, positioning means for positioning said corresponding wheel by clamping said wheel from both sides thereof and detecting means for detecting an inclination of said wheel with respect to a predetermined reference line; first interconnecting means for interconnecting said supporting means of each of said first and second pairs of wheel examining units such that the supporting means of each of said first and second pairs of wheel examining units are located symmetrical with respect to a longitudinal center line of said system; and second interconnecting means for interconnecting said positioning means of each of said first and second pairs of wheel examining units such that the positioning means of each of said first and second pairs of wheel examining units are located symmetrical with respect to the longitudinal center line of said system. In the preferred embodiment of this aspect of the present invention, the supporting means includes a pair of rollers arranged in parallel and the positioning means includes contact rollers located on both sides of the wheel so as to be separated away from and brought into rolling contact with the opposite surfaces of the wheel.

In accordance with a still further aspect of the present invention, there is provided a roller lock apparatus for locking or unlocking a pair of rollers simultaneously, which is particularly suitable for application to a wheel examining apparatus. That is, the present roller lock apparatus for locking and unlocking a pair of rollers, which are rotatably supported and spaced apart from each other over a predetermined distance, comprises: a pair of first and second gears each integrally provided to a corresponding one of said pair of rollers; a rotatably supported intermediate gear in mesh with both of said first and second gears; a lock gear movable between a first position where said lock gear meshes with both of said intermediate gear and one of said first and second gears and a second position where said lock gear is separated away from at least one of said intermediate gear and said one of said first and second gears; and position controlling means for controlling the position of said lock gear between said first and second positions. In the preferred embodiment of this aspect of the present invention, the pair of rollers is a pair of support rollers for rotatably supporting thereon a wheel of a vehicle in a wheel examining apparatus.

In accordance with a still further aspect of the present invention, there is provided a rotating object thrust absorbing apparatus for absorbing a thrust which occurs when a rotating object, such a wheel of a vehicle, is placed on rollers if the rotating axis of the rotating object is not in parallel with the rotating axis of each of the rollers, and the present rotating object thrust absorbing apparatus is particularly suitable for use in a wheel examining apparatus. That is, the present rotating object thrust absorbing apparatus comprises: a frame supported to be movable in a plane; at least two rollers rotatably supported by said frame for rotatably supporting thereon a rotating object; first engaging means provided at one end of said frame; and positioning means including second engaging means engageable with said first engaging means, whereby said frame moves around said second engaging means under the condition of said first and second engaging means being in engagement to thereby absorb a thrust between said rotating object and said at least two rollers. In the preferred embodiment, the rotating object is a wheel of a vehicle and the rollers are support rollers of a wheel examining apparatus for rotatably supporting thereon a wheel of a vehicle, whereby any thrust occurring between the wheel and the support rollers is absorbed due to the pivotal motion of the rollers and the frame with respect to the rotating wheel. Thus, the frame and the support rollers continue to pivot around the second engaging means until the rotating axis of each of the support rollers is aligned in parallel with the rotating axis of the rotating wheel, whereby the toe of the wheel can be determined.

In accordance with a still further aspect of the present invention, there is provided a wheel examining apparatus which includes a floating table having a flat support surface for supporting thereon a wheel of a vehicle to be examined. The wheel supported on the floating table is clamped by rollers on both side surfaces and under this condition an inclination of the wheel with respect to a predetermined reference line is detected. In the preferred embodiment, the wheel on the floating table is clamped by rollers such that at least two rollers are brought into rolling contact with one side surface of the wheel. In this case, the floating table is held to be freely movable translationally as well as rotationally in a plane in parallel with or substantially in parallel with the horizontal plane.

In accordance with a still further aspect of the present invention, there is provided a clamp apparatus for clamping a wheel from both sides thereof by contact members, whereby the contact members on both sides of the wheel are arranged asymmetrically. In the preferred embodiment of this aspect of the present invention, a pair of contact members is disposed on each side of a wheel, and when the wheel is clamped by bringing a pair of contact members in pressure contact with a corresponding side surface of the wheel, the contact members in contact with both side surfaces of the wheel are asymmetrically arranged. In one embodiment, the right and left contact members to be brought into contact with the right and left side surfaces of a wheel are arranged at different angular positions in the rotating direction of the wheel. In the preferred embodiment, a pair of contact members to be brought into contact with one side surface of a wheel and another pair of contact members to be brought into contact with the opposite side surface of the wheel are arranged shifted in position in the rotating direction of the wheel. With such an arrangement, the wheel can be clamped more stably. In particular, since the contact members are preferably brought into contact with the teir portion of the wheel and not the rim portion of the wheel, the wheel can be clamped extremely stably by bringing the right and left contact members staggered in angular position with respect to the rotating direction of the wheel into pressure contact with the right and left side surfaces of the wheel.

When the right and left side surfaces of a wheel are clamped by a plurality of contact members asymmetrically, use is preferably made of rollers as the contact members. In this case, the rollers are arranged such that they are brought into rolling contact with the side surfaces of a wheel and thus they rotate as the wheel rotates. Alternatively, use may also be made of sliders or the like which may slidingly move in one or more predetermined directions while keeping in contact with the side surface of a wheel. Furthermore, in this case, a wheel to be examined may be placed on a floating table having a top flat surface; alternatively, a wheel may be placed on two or more horizontal support rollers. In the latter structure, a wheel is rotatably supported and thus the wheel may be rotated while being clamped. However, when the wheel is to be rotated, rollers should be used as the contact members. When a wheel is placed on support rollers and clamped by contact rollers on both sides, the wheel may be rotated so that measurements may be made not only for the wheel inclination, but also for a dynamic performance, such as the amplitude of wheel wiggling. In this case, a motor may be incorporated in one of the support rollers to drive to rotate the support roller to thereby rotate the wheel placed thereon; whereas, an externally provided motor may be detachably coupled to one of the support rollers through a coupling. Moreover, all of the support rollers may be set in a freely rotatable state and the wheel placed thereon may be driven to rotate by an engine of its vehicle.

In accordance with a still further aspect of the present invention, there is provided an angle detecting apparatus, comprising: at least one upper contact member contactable with an upper portion of one side surface of a wheel; at least one lower contact member contactable with a lower portion of the one side surface of a wheel; an arm mounted with said upper and lower contact members; supporting means for pivotally supporting said arm such that said upper and lower contact members may be moved closer to or separated away from the one side surface of a wheel; and detecting means for detecting an angle of said arm from a predetermined reference line. In the preferred embodiment, the angle to be detected is the camber of a wheel. Thus, the arm extends substantially normal to the horizonal plane and thus in parallel with the side surface of a wheel. When both of the upper and lower contact members are brought into contact with a side surface, preferably the outer side surface, of a wheel, the angle defined by the arm with respect to the vertical line indicates the camber of the wheel.

In such a camber detecting apparatus, use is preferably made of contact rollers as the contact members. In this case, each of the contact rollers is arranged to be in rolling contact with a side surface of a wheel so that the contact rollers rotate as the wheel rotates. In the preferred embodiment, there is provided a single upper contact roller which is rotatably mounted at the forward end of an arm so that the upper contact roller may be brought into rolling contact with the side surface of a wheel at its upper position under pressure. Preferably, two lower contact rollers are provided and they are spaced apart from each other over a predetermined distance in the circumferential direction of the wheel and disposed to be brought into contact with the side surface of the wheel at its lower position. With this structure, the three contact rollers are brought into contact with one side surface of a wheel at three points.

Preferably, a pivotal axis of the supporting means for pivotally supporting the arm is located between the upper and lower contact rollers with a predetermined positional relationship. That is, most preferably, it is so set that a vertical distance between a contact point between the upper contact roller and a side surface of a wheel and the pivotal axis is approximately three times of a vertical distance between a contact point between each of the lower contact roller and the side surface of a wheel and the pivotal axis. With this structure, these three rollers of upper and lower contact rollers are automatically brought into contact with one side surface of a wheel simply by moving these three rollers closer thereto. The lower contact rollers may also be used as toe detecting rollers for detecting the toe of the wheel while clamping the wheel by contact rollers from both sides. Moreover, in the case where use is made of rollers as the contact members, the camber of a wheel can be measured while the wheel is maintained in rotation, and, thus, in place of the floating table having a flat support surface, use may also be made of a plurality of support rollers for rotatably supporting a wheel thereon.

In accordance with a still further aspect of the present invention, there is provided an angular displacement detecting apparatus for detecting an angular displacement of a rotating shaft high in the degree of freedom in arrangement. The present angular displacement detecting apparatus detects an angular displacement of a rotating shaft rotatably mounted on a frame. A first gear is fixedly attached to the rotating shaft, and a bracket is pivotally mounted on the frame with an angular detecting device, such as a rotary encoder being fixedly attached to the bracket. A second gear is fixedly attached to the rotary shaft of the angular detecting device. Furthermore, the bracket is urged to pivot in a predetermined direction by an elastic member such that the first and second gears normally maintain to be meshed each other. In the preferred embodiment, a spring is provided to extend between the bracket and the frame to provide the bracket a tendency to pivot in a predetermined direction. With this structure, the degree of freedom in designing an angular displacement detecting apparatus is significantly increased, and an angular displacement can be detected accurately at all times since it is free of influence of backlash even if use is made of gears. Preferably, the present angular displacement detecting apparatus is used for detecting a wheel inclination, such as toe and camber of a wheel.

It is therefore a primary object of the present invention to obviate the disadvantages of the prior art as described above and to provide an improved wheel examining apparatus.

Another object of the present invention is to provide an improved wheel examining apparatus capable of detecting a performance of a wheel, in particular its dynamic performance, at high accuracy without being affected by the kind or condition of a wheel.

A further object of the present invention is to provide an improved wheel examining apparatus capable of examining not only a static performance of a wheel but also a dynamic performance of a wheel at high accuracy.

A still further object of the present invention is to provide a wheel examining system capable of examining four wheels of a 4-wheel vehicle at the same time.

A still further object of the present invention is to provide a novel roller lock apparatus particularly suitable for use in a wheel examining apparatus.

A still further object of the present invention is to provide a novel rotating object thrust absorbing apparatus particularly suitable for use in a wheel examining apparatus.

Other objects, advantages and novel features of the present invention will become apparent from the following detailed description of the invention when considered in conjunction with the accompanying drawings.

BRIEF DESCRIPTION OF THE DRAWINGS

FIG. 5b is a schematic, plan view showing the structure of FIG. 5a;

FIG. 5c is a partial, schematic, cross-sectional view showing part of the structure of FIG. 5a;

FIGS. 16 through 18 are schematic illustrations showing a wheel examining system 201 constructed in accordance with a further embodiment of the present invention;

FIG. 29 is a schematic, perspective view showing an embodiment in which use is made of a cylinder actuator for moving a camber sensor arm; and FIGS. 30 and 31 are schematic illustrations showing an embodiment when the static wheel examining apparatus shown in FIGS. 19 through 21 is converted into a dynamic wheel examining apparatus in which a wheel is examined while it is maintained in rotation.

DESCRIPTION OF THE PREFERRED EMBODIMENTS

Figure 1:
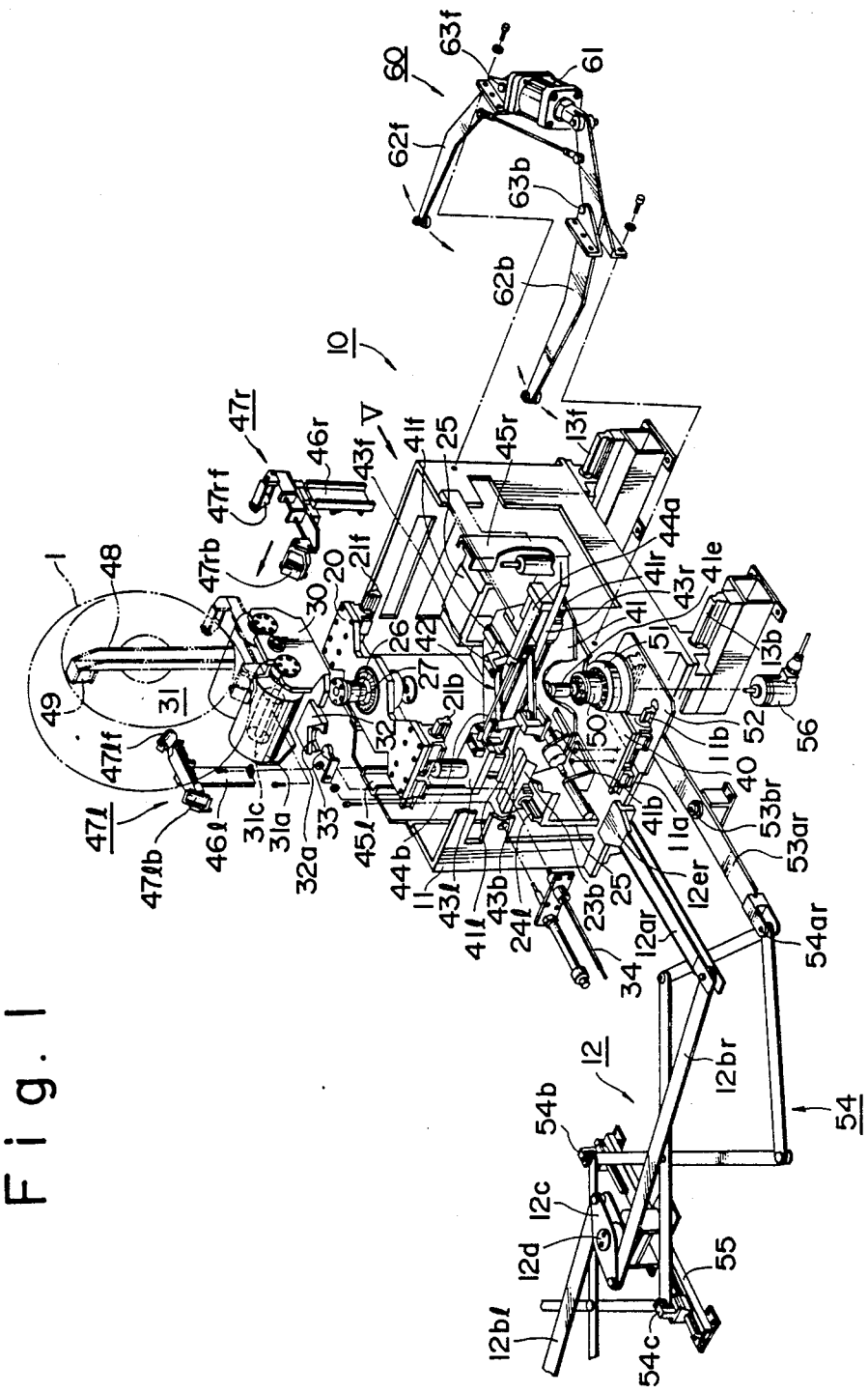
FIG. 1 is a schematic, exploded, perspective view showing a wheel examining apparatus 10 constructed in accordance with one embodiment of the present invention.

Referring now to FIG. 1, there is shown a wheel examining apparatus 10 constructed in accordance with one embodiment of the present invention. As shown, the present wheel examining apparatus 10 includes a generally box-shaped housing 11 which is comprised of a bottom wall 11a of a generally rectangularly shaped flat plate and four side walls, each extending vertically upward from the corresponding edge of the bottom wall 11a and formed with a particularly shaped opening. An arm 12ar is fixedly attached to one end of the bottom wall 11a through a bracket 12er. The tip end of the arm 12ar is pivotally connected to the tip end of a lever 12br which defines a part of an equalizer 12, which, in turn, includes a center lever 12c which has its one end pivotally connected to the other end of the lever 12br. The center lever 12c has its center pivotally supported by a pivot shaft 12d and thus it rotates horizontally around the pivot shaft 12d. The equalizer 12 is symmetrically right and left in shape and it also includes a lever 12bl corresponding to the lever 12br.

Figure 2:
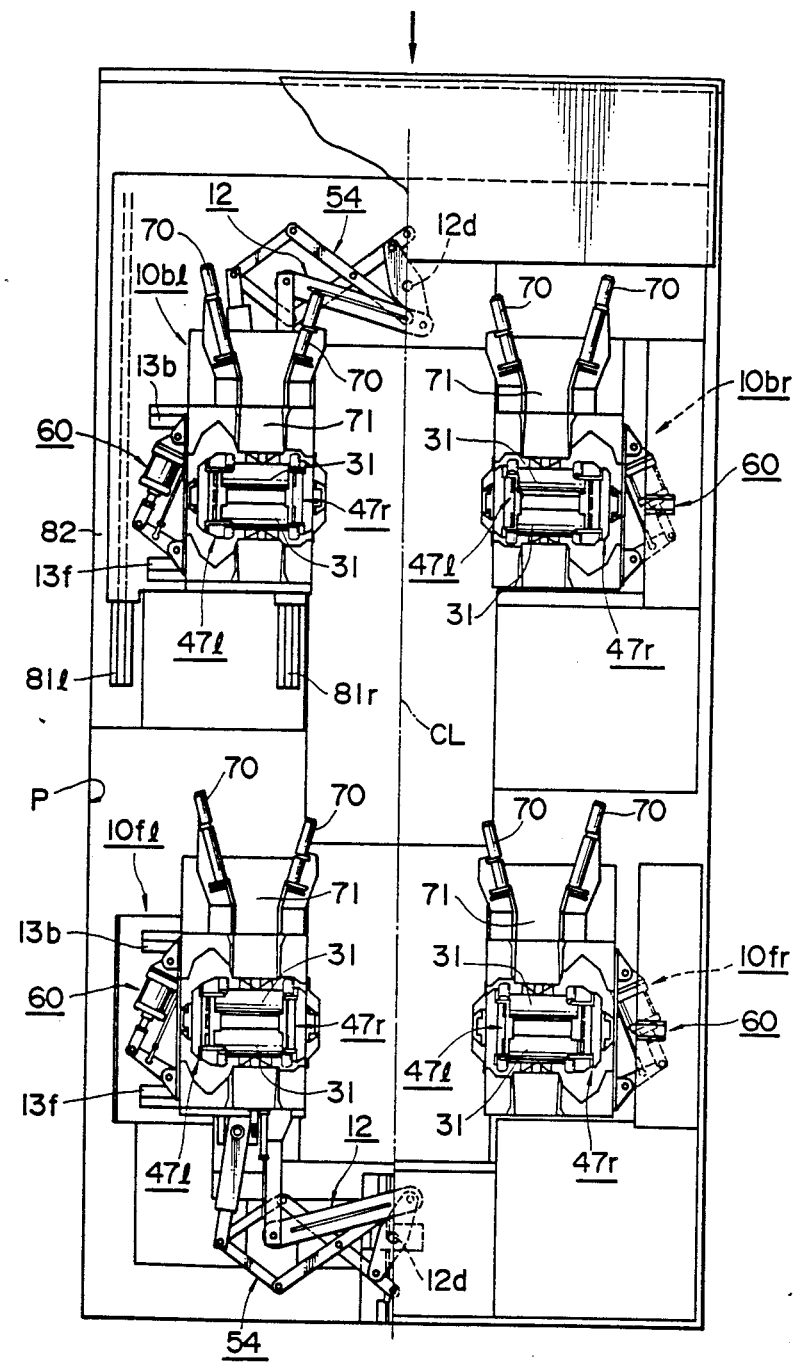
FIG. 2 is a schematic illustration showing a wheel examining system provided with four wheel examining apparatuses of FIG. 1 arranged for examining four wheels of a 4-wheel vehicle at the same time constructed in accordance with another embodiment of the present invention.
Figure 3:
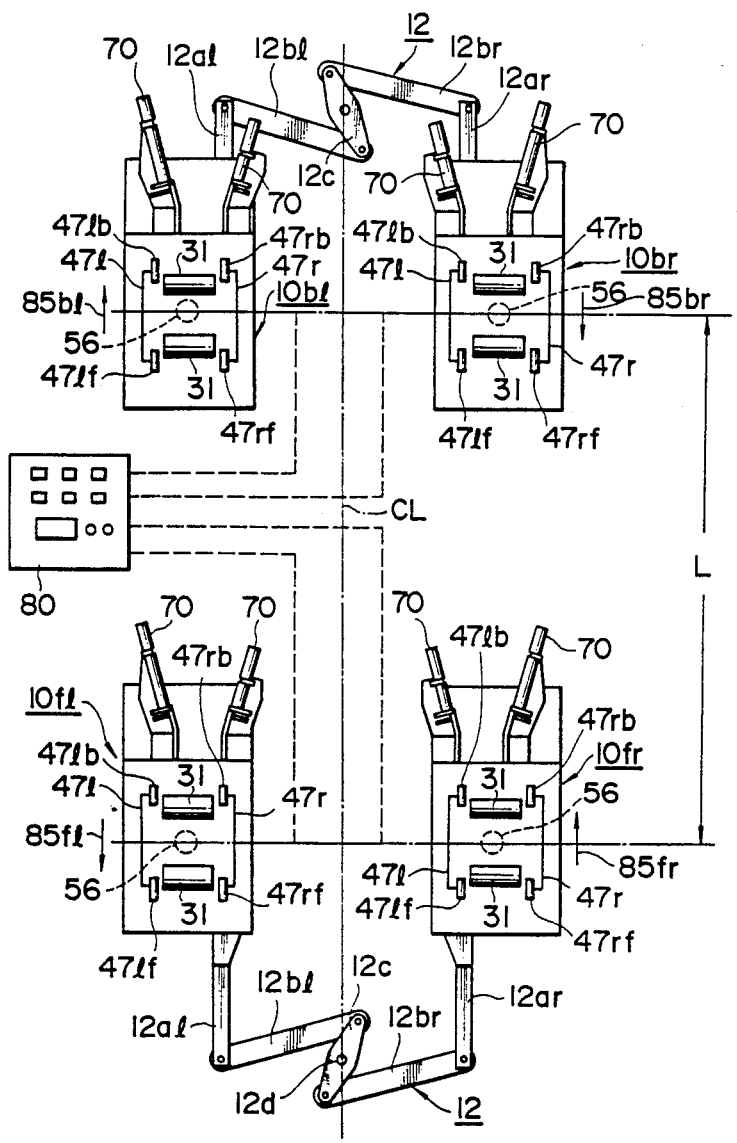
FIG. 3 is a schematic illustration showing a detecting function of the wheel examining system shown in FIG. 2.

As shown in FIGS. 2 and 3, there are normally provided four wheel examining apparatuses 10 corresponding to four wheels of a 4-wheel vehicle. In a wheel examining system shown in FIGS. 2 and 3, a pair of wheel examining apparatuses 10 is arranged spaced apart from each other in the transverse direction for the two front wheels of a vehicle, and another pair of wheel examining apparatuses 10 is arranged spaced apart from each other in the transverse direction for the two rear wheels of the vehicle. Thus, in the wheel examining system shown in FIGS. 2 and 3, four wheel examining apparatuses 10 are provided as arranged in the longitudinal and transverse directions. However, as will be described later, each of the wheel examining apparatuses 10 is provided to be movable at least in the transverse direction. Thus, the paired wheel examining apparatuses 10 for the front or rear wheels are provided to be movable on horizontally extending guide rails such that the paired wheel examining apparatuses 10 may move closer to each other or separated away from each other. It may also be so structured that the distance between the paired front wheel examining apparatuses 10 and the paired rear wheel examining apparatuses 10 may be varied by providing longitudinally extending rails, in which case, the present wheel examining system may be used for vehicles having different wheel base distances.

As shown in FIG. 2, a pair of wheel guides 70 is fixedly attached to the housing 11 of each of the wheel examining apparatuses 10, and these wheel guides 70 are spaced apart from each other over a predetermined distance and serve to guide a wheel into the corresponding wheel examining apparatus 10 as the wheel advances. A pair of wheel guides 70 is bent outwardly at its forward end and thus when a vehicle to be examined advances in the direction indicated by the arrow, i.e., from top to bottom in FIG. 2, the corresponding wheel comes into contact with one of these wheel guides 70 to move the corresponding wheel examining apparatus 10 in the transverse direction, thereby permitting the wheel to properly move into a predetermined position of the corresponding wheel examining apparatus 10. In this case, since the pair of right and left wheel examining apparatuses 10 is operatively coupled through the equalizer 12, when the right and left wheels are properly positioned in the pair of right and left wheel examining apparatuses 10, the tread center, which is the center between the right and left wheels, is substantially aligned with a center line CL of the present wheel examining system, which is defined by connecting the centers 12d of the front and rear equalizers 12 by a straight line. That is, a longitudinal center line of a vehicle to be examined, which is defined by connecting the front and rear tread centers of the vehicle by a straight line, comes into substantial alignment with the center line CL of the wheel examining system, which is defined by connecting the centers 12d of the front and rear equalizers 12 by a straight line.

FIG. 3 illustrates the system in which a pair of right and left wheel examining apparatuses 10 for front wheels is operatively coupled through the front equalizer 12 and another pair of right and left wheel examining apparatuses 10 for rear wheels is also operatively coupled through the rear equalizer 12. Thus, the front equalizer 12 has a fixed center 12d and the pair of right and left wheel examining apparatuses 10 are always located symmetrically right and left with respect to this center 12d. The rear equalizer 12 also has a similar center 12d. Thus, a hypothetical longitudinal center line CL defined by connecting the centers 12d of the front and rear equalizers 12 by a straight line also defines a center line of the present wheel examining system. Besides, the distance L between the center of the front wheel examining apparatus 10 and the center of the rear examining apparatus 10 corresponds to the wheel base distance of a vehicle to be examined. As described previously, it may be so structured that the distance L between the front and rear wheel examining apparatuses 10 may be varied by moving at least one of the front and rear pairs of wheel examining apparatuses 10 relative to each other in the longitudinal direction. With this structure, the present wheel examining system may be used for vehicles of different wheel base distances.

Returning to FIG. 1, the housing 11 of the wheel examining apparatus 10 is movably supported on a pair of guide rails 13f and 13b which extend in the transverse direction and spaced apart from each other in the longitudinal direction. The guide rails 13f and 13b may be fixedly laid on the bottom of pit P (see FIG. 10) of an examining site, or, alternatively, if it is so structured that the distance L may be varied, they are mounted on other guide rails (not shown) which extend in the longitudinal direction. In this manner, since the wheel examining apparatus 10 is movably mounted on the guide rails 13f and 13b in the transverse direction, when a vehicle to be examined advances and its wheel moves into the corresponding wheel examining apparatus 10, the position of the vehicle in the transverse direction is adjusted such that the longitudinal center line of the vehicle is aligned with the longitudinal center line CL of the present wheel examining system.

A pair of generally U-shaped supports 25 is fixedly attached to the bottom wall 11a of the housing as arranged in parallel and spaced apart from each other in the longitudinal direction, each support 25 extending in the transverse direction. A pair of right and left guide rails 24l and 24r (24r not shown) is fixedly attached to the supports 25 as extending therebetween. A pair of intermediate support members 23f and 23b (23f not shown) is slidably mounted on the pair of right and left guide rails 24l and 24r as spaced apart from each other in the longitudinal direction. Each of these intermediate guide rails 23f and 23b is provided with a corresponding one of guide rails 21f and 21b as fixedly attached thereto. A floating table 20 is slidingly mounted on the guide rails 21f and 21b so that the floating table 20 may move in the transverse direction as guided by the guide rails 21f and 21b. A pair of lower guide rails 24f and 24b and a pair of upper guide rails 21f and 21b extend normal to each other, i.e., the lower guide rails 24r and 24l extending in the longitudinal direction and the upper guide rails 21f and 21b extending in the transverse direction. As a result, the floating table 20 move in any desired direction in a plane parallel to the bottom wall 11a of the housing 11 relative thereto.

At the center of the floating table 20 is provided an upper center rotating shaft 27 through a rotary bearing 26. The upper rotating shaft 27 defines the center of the floating table 20 and it does not move in the vertical direction normal to the plane of the floating table 20, but it may rotate relative to the floating table 20 through the rotating bearing 26. A generally U-shaped support roller assembly 30 is fixedly attached to the top end of the upper center shaft 26. The support roller assembly 30 includes a bottom wall and a pair of side walls extending upright from the opposite sides of the bottom wall. And a pair of support rollers 31 is arranged in parallel and spaced apart from each other at a predetermined distance, each extending between the pair of side walls of the support roller assembly 30 and being rotatably supported. The corresponding wheel 1 of a vehicle to be examined is rotatably placed on the pair of support rollers 31 when the vehicle to be examined is set in position.

Figure 8A:
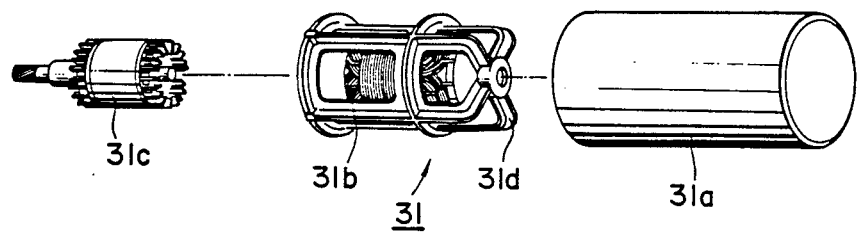
FIGS. 8a and 8b are schematic illustrations showing two alternative examples of a support roller 31 for use in the wheel examining apparatus 10 of FIG. 1.
Figure 8B:
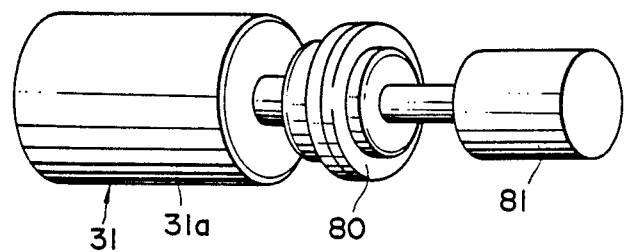

In one embodiment of the present invention, at least one of the pair of support rollers 31 is coupled to a driving means. That is, in this case, at least one of the pair of support rollers 31 is driven to rotate so that the wheel 1 placed on the pair of support rollers 31 is driven to rotate through a frictional contact with the support rollers 31. In this case, it may be so structured that at least that of the pair of support rollers 31 which is driven to rotate is provided with a plurality of longitudinal grooves around its peripheral surface so as to provide an increased frictional contact between the support roller 31 and the wheel 1 riding thereon. As the driving means for driving to rotate at least one of the support rollers 31, use may, for example, be made of a motor. Such a driving motor may be provided separately from the support rollers 31, or, alternatively, it may be provided inside of at least one of the support rollers 31. That is, FIG. 8a illustrates an embodiment in which a driving motor is incorporated in one of the support rollers 31, and this embodiment corresponds to the structure shown in FIG. 1. On the other hand, FIG. 8b illustrates another embodiment in which a driving motor 81 is provided separately from the support rollers 31 and the motor 81 is operatively coupled to the support roller 31 through a clutch 80.

In the structure shown in FIG. 8a, the support roller 31 includes a cylindrical case 31a, a coil 31b fixedly provided inside of the cylindrical case 31a through a support frame 31d and an armature 31c disposed inside of the coil 31b as separated therefrom. Also in the embodiment shown in FIG. 1, the armature 31c is indicated inside of the support roller 31. Thus, in this structure, the armature 31c is provided fixed in position and thus stationary and the coil 31b and the cylindrical case 31a integral with the coil 31b are provided to be rotatable around the armature 31c. FIG. 8b shows an alternative embodiment in which the support roller 31 only includes a rotatable cylindrical case 31a and does not have any coil or armature therein. In this structure, the cylindrical case 31a may be operatively coupled to or decoupled from an outside motor 81 through a clutch 80 so that the support roller 31 may be driven to rotate in a predetermined direction by means of the outside motor 81. As a modification of the structure shown in FIG. 8b, it may also be so structured that a pulley is fixedly attached to one end of the cylindrical case 31a and the rotating force is transmitted to the cylindrical case 31a from the motor 81 through a belt.

In the above-described structure for rotatably supporting the wheel 1 of a vehicle, there are provided two support rollers 31 rotatably and spaced apart from each other in the longitudinal direction of the vehicle; however, the support rollers 31 may be provided in any desired number, including one and three. Furthermore, instead of using the support rollers 31, any other structure for rotatably supporting a wheel 1 of a vehicle may also be used. For example, use may be made of an endless belt extending between a pair of support rollers and a wheel 1 of a vehicle may be rotatably supported on such an endless belt. Moreover, use may also be made of a flat plate provided with a number of balls or rollers on top thereof to thereby rotatably support a wheel 1 thereon. In this case, however, means for limiting the position of a wheel 1 in the longitudinal direction must also be provided.

Again returning to FIG. 1, an engaging member 32 is integrally provided at the front and rear ends of the support roller assembly 30. The engaging member 32 may be defined by machining part of the support roller assembly 30, if desired. Each of the engaging members 32 extends forwardly and backwardly and is formed with a generally circular engaging hole 32a at its tip end. In the illustrated embodiment, such an engaging hole 32a is shown to be formed with its part open. Furthermore, as shown in FIG. 1, there is provided an engaging projection 33 corresponding in position to the engaging hole 32a, and the engaging projection 33 is movable between its advanced and retracted positions in the longitudinal direction and engageable with the engaging hole 32a of the support roller assembly 30 at its advanced position. Here, it is to be noted that the engaging member 32 and the engaging projection 33 define a support roller pivotting system in which the support roller assembly 30 may pivot in a plane, such as a horizontal plane, with the engaging projection 33 as the center of such a pivotal motion. Thus, when the wheel 1 on the support rollers 31 rotate, there is produced a thrust force between the wheel 1 and the support rollers 31 so that the support rollers 31 and thus the support roller assembly 30 pivot in a plane until the rotating axis of the wheel 1 becomes substantially parallel with the rotating axis of the support roller 31, whereby the wheel 1 and the support rollers 31 are aligned in orientation. A more detailed description regarding this support roller pivotting system will be found later with reference to FIGS. 13 and 14.

As described above, the support roller assembly 30 supports a wheel 1 to be examined rotatably around its own rotating axis and also rotatably around the upper rotating center shaft 27 within a plane relative to the housing 11. Besides, the support roller assembly 30 also supports the wheel 1 to be movable translationally in a plane relative to the housing 11 through the upper and lower guide rails 21f, 21b and 24l and 24r.

A pair of guide rails 11f and 11b (11f not shown) is fixedly attached to the bottom wall 11a of the housing 11 as extending in the transverse direction and spaced apart from each other in the longitudinal direction. A lower support table 40 is silidably mounted on these guide rails 11f and 11b so that the lower support table 40 may move freely in the transverse direction as guided by these guide rails 11f and 11b. A plurality of balls 59 (see FIG. 5a) are rotatably provided at the top surface of the lower support table 40 and an upper support table 41 is placed on the plurality of balls 59, so that the upper support table 41 may move relative to the lower support table 40 in a plane parallel to the plane defined by the lower support table 40. A pantagraph mechanism 42 comprised of four levers connected in the form of a link is mounted on the upper support table 41. Described more in detail in this respect, two pairs of guide rails 41f and 41b and 41r and 41l are arranged in the shape of a cross on the upper support table 41 as fixedly attached thereto, and a pair of sliders 43f and 43b is slidably mounted on the longitudinal guide rails 41f and 41b with a pair of blocks 43r and 43l being slidably mounted on the transverse guide rails 41r and 41l. These sliders 43f and 43b and blocks 43r and 43l are interconnected by the four levers of the pantagraph mechanism 42.

A cylinder actuator 44a is fixedly mounted on the block 43r and the cylinder actuator 44a has a rod 44b which may move out of and into the cylinder actuator 44a has its tip end fixedly attached to the opposite block 43l. Thus, when the cylinder actuator 44a is operated, the oppositely arranged blocks 43r and 43l are moved closer together or separated away from each other. In this case, since these blocks 43r and 43l are operatively interconnected by the pantagraph mechanism 42, the blocks 43r and 43l are maintained symmetrical in position with respect to the center of the pantagraph mechanism 42.

The left and right blocks 43l and 43r are fixedly provided with left and right contact roller assemblies 47l and 47r, respectively. For this purpose, each of the blocks 43l and 43r is formed generally in the shape of letter "L", and thus includes a vertically extending lower holder portion 45l, 45r, which extends upright from the terminal end of a horizontal portion. On the other hand, the pair of contact roller assemblies 47l and 47r similarly includes upper holding portions 46l and 46r which are fitted into the lower holding portions 45l and 45r of the blocks 43l and 43r when assembled. As a result, each of the contact roller assemblies 47l and 47r is provided to be integral with the corresponding one of the blocks 43l and 43r. Each of the contact roller assemblies 47l and 47r has either one of paired contact rollers 47lf–47lb and 47rf–47rb. The paired contact rollers 47lr and 47lb or 47rf and 47rb are rotatably supported (see FIG. 5c) and they are arranged as inclined with respect to a vertical line such that the direction of rotation of each of the contact rollers agrees with the moving direction (or circumferential direction) of the side surface of a wheel 1 when the contact rollers are brought into rolling contact therewith. In other words, the contact rollers are inclined such that the rotating axis of each of the contact rollers extends radially with respect to a wheel 1 to which the contact rollers are brought into rolling contact. Thus, if it is desired to use the present wheel examining apparatus 10 for wheels of different diameters, it may be preferably so structured that the degree of inclination of each of the contact wheels is adjustable.

Since these contact roller assemblies 47*l* and 47*r* are fixedly attached to the respective blocks 43*l* and 43*r*, they are provided to move closer together or separated away from each other. Thus, these contact roller assemblies 47*l* and 47*r* may move between a retracted position where they are separated away from a wheel 1 supported on the support rollers 31 and an advanced position where they are brought into rolling contact with the left and right side surfaces of the wheel 1. The movement of these contact roller assemblies 47*l* and 47*r* relative to the wheel 1 is controlled by operating the two-way cylinder actuator 44*a*. That is, when a hydraulic pressure is given to the cylinder actuator 44*a* in one direction to cause the rod 44*b* to project outwardly, the pair of contact roller assemblies 47*l* and 47*r* is moved further separated from each other toward its retracted position. On the other hand, when a hydraulic pressure is given to the cylinder actuator 44*a* in the opposite direction, the rod 44*b* is pulled back into the cylinder actuator 44*a* so that the pair of contact roller assemblies 47*l* and 47*r* are forced to move closer together toward its advanced position where their contact rollers are brought into rolling contact with the left and right side surfaces of the wheel 1.

A lower center shaft 41*e* is fixedly attached to the upper support plate 41 at its center and the lower center shaft 41*e* extends vertically downward and into a rotary bearing 50 mounted on the lower support plate 40 at its center. As best shown in FIG. 5*b*, the center of the lower center shaft 41*e* is always aligned in position with the center of the pantograph mechanism 42. Thus, even if the pantograph mechanism 42 varies its shape as it is operated by the cylinder actuator 44*a*, the center of the pantograph mechanism 42, i.e., the center between the pair of oppositely arranged contact roller assemblies 47*l* and 47*r*, always remains aligned with the center of the lower center shaft 41*e*. Thus, after locating a wheel 1 in position on the support rollers 31, when the cylinder actuator 44*a* is operated to bring the pair of contact roller assemblies 47*l* and 47*r* into rolling contact with the side surfaces of the wheel 1, the geometrical center of the wheel 1 as an object to be examined is determined as the center of the pair of opposite contact roller assemblies 47*l* and 47*r*, and, as a result, the geometrical center of the wheel 1 is aligned with the center of the lower center shaft 41*e*. In this case, if the geometrical center of the wheel 1 is in alignment with the center of the upper center shaft 27, the upper center shaft 27 is also aligned with the lower center shaft 41*e*.

The inner rotary bearing 50 rotatably supports the lower center shaft 41*e* and it is itself rotatably supported in an outer rotary bearing 51. And, the outer rotary bearing 51 is movably supported on a pivotal plate 52. That is, as also shown in detail in FIG. 4, a pivotal lever 53*ar* integrally formed with the pivotal plate 52 extends from one end of the pivotal plate 52 and the pivotal lever 53*ar* is pivotally supported approximately at its centeral portion at a fixed pivotal point 53*br* fixedly defined at the bottom of the pit. The other end of the pivotal lever 53*ar* is connected to a pantograph 54 through a pin 54*ar*. The pantograph 54 is pivotally connected to a pair of sliders 54*b* and 54*c* which are slidably mounted on a longitudinally extending rail 55 which is fixedly laid down at the bottom of the pit. Although not shown in FIGS. 1 and 4, another wheel examining apparatus similar to the one 10 shown in FIG. 1 is connected at the other end of the pantograph 54. Thus, the lower center shaft 41*e* of the wheel examining apparatus 10 moves around the pivotal point 53*br* along a circular path; however, the lower center shafts 41*e* of the left and right wheel examining apparatuses 10 interconnected by the pantograph 54 are always maintained symmetrical in position with respect to the longitudinal center line CL. Thus, when the cylinder actuators 44*a* of the respective left and right wheel examining apparatuses 10 are operated to clamp the wheel 1 by bringing the contact rollers in rolling contact therewith, the lower center shafts 41*e* of the left and right wheel examining apparatuses 10 are located symmetrically with respect to the longitudinal center line CL, and therefore the geometrical centers of the left and right wheels 1 come to be located symmetrically with respect to the longitudinal center line CL.

Figure 4:
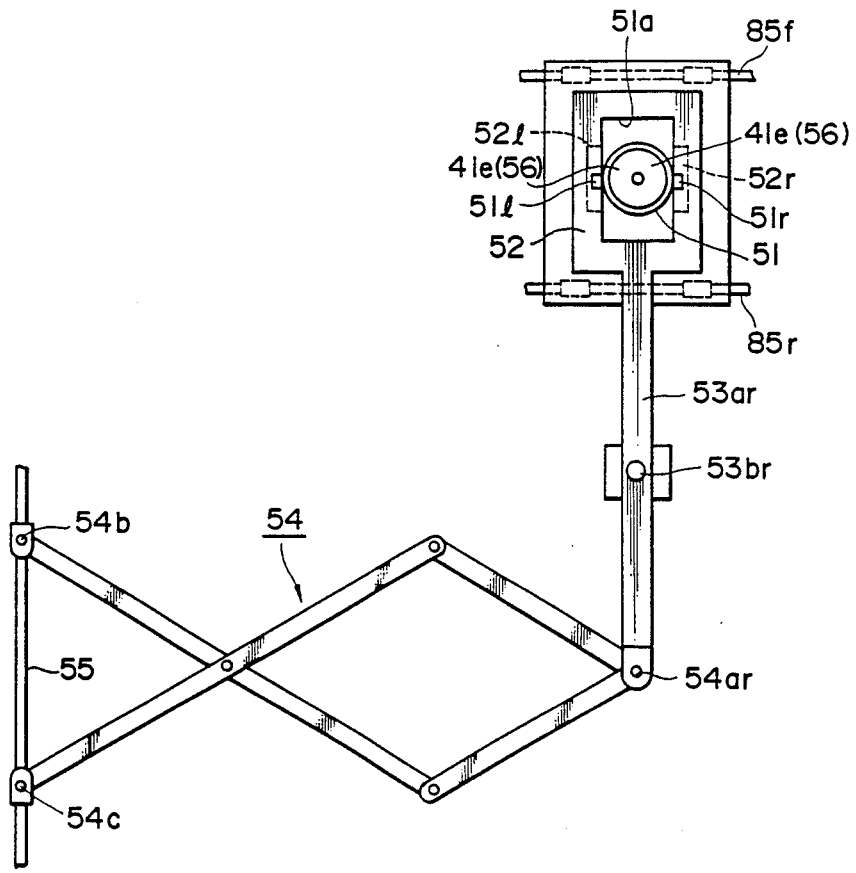
FIG. 4 is a partial, schematic illustration showing a connecting condition between a lower rotating shaft 41e of the wheel examining apparatus 10 of FIG. 1 and a pivotal plate 52 supporting the lower rotating shaft 41e and a pantagraph connected thereto.

As shown in FIG. 4, the pivotal plate 52 is provided to be slidable on a pair of guide rails 85*f* and 85*b* which are fixedly laid on the bottom of the pit. Since the pivotal plate 52 moves in a horizontal plane pivotally around the pivot point 53*br*, these guide rails 85*f* and 85*r* are defined arcuate in shape with the pivot point 53*br* as the center. The outer rotary bearing 51 is provided with a pair of left and right projections 51*l* and 51*r* and the outer rotary bearing 51 is disposed in a generally rectangularly shaped opening 51*a* formed in the pivotal plate 51. A pair of grooves 52*l* and 52*r* is formed at the left and right opposite surfaces of the rectangular opening 51 of the pivotal plate 51, and the pair of left and right projections 51*l* and 51*r* of the outer rotary bearing 51 is slidably received in the respective grooves 52*l* and 52*r*. Accordingly, the pivotal plate 52 pivotally moves around the pivotal point 53*br*; however, in this case, the outer rotary bearing 51 and thus the lower center shaft 41*e* only move linearly in the transverse direction normal to the longitudinal center line CL of the wheel examining system. This is because, the lower center shaft 41*e* is interconnected to the lower support plate 40 through the inner rotary bearing 50 and the lower support plate 40 is supported to be slidably movable only in the transverse direction along the transverse guide rails 11*f* and 11*b*.

Figure 5A:
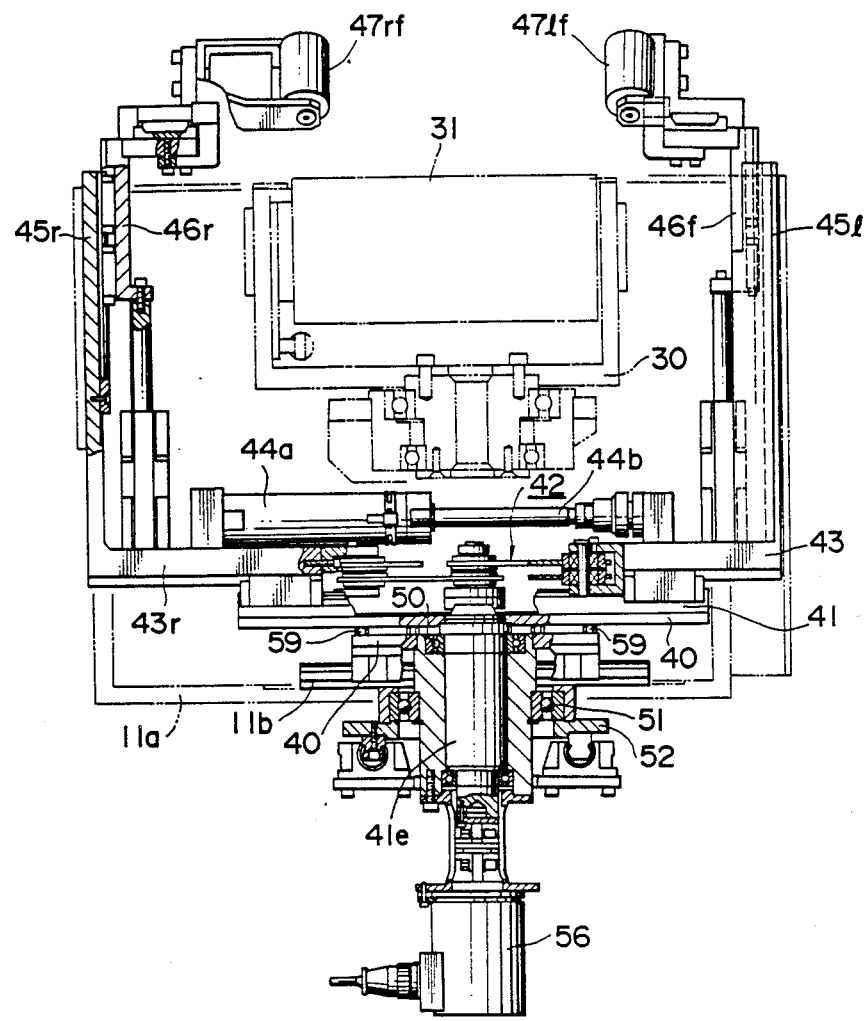
FIG. 5a is a partial, schematic, vertical cross-sectional view showing part of the wheel examining apparatus 10 of FIG. 10 when viewed in the direction indicated by V in FIG. 1.
Figure 5B:
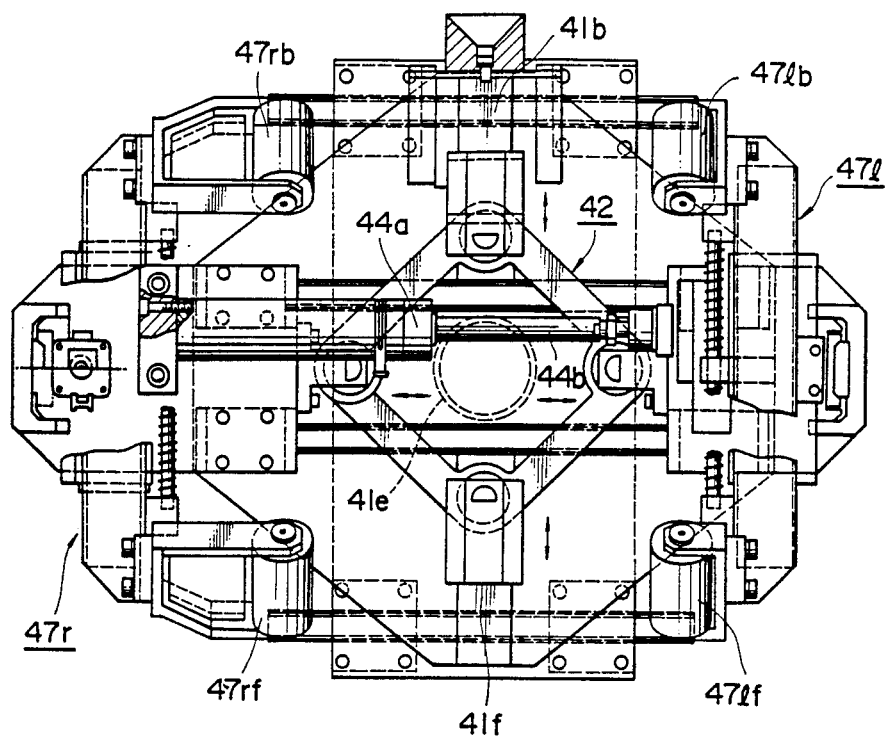
Figure 5C:
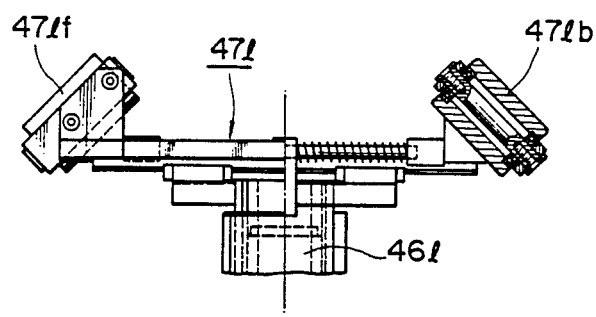

Furthermore, as shown in FIGS. 1 and 5*a*, a toe angle detector 56 is fixedly attached to the bottom end of the lower center shaft 41*e*. That is, when the pair of contact roller assemblies 47*l* and 47*r* are advanced to their advanced position to bring their contact rollers in rolling contact with the wheel 1, the orientation of the upper support plate 41 is aligned with the orientation of the wheel 1. Since the lower center shaft 41*e* is fixedly attached to the upper support plate 41 at its center, the rotary position of the lower center shaft 41*e* agrees with the direction of the wheel 1. Since the toe angle detector 56 is fixedly attached at the bottom end of the lower center shaft 41*e*, the toe of the wheel 1 clamped by the pair of contact roller assemblies 47*l* and 47*r* can be determined accurately by detecting the angular displacement of the lower center shaft 41*e* from its reference angular position.

As shown in FIG. 1, the present wheel examining apparatus 10 is also provided with a lock device 60. The lock device 60 is mounted on the housing 11 and engageable with the pair of support rollers 31, which are locked and set to be unrotatable when the lock device 60 is brought into engagement with the support rollers 31. In the illustrated embodiment, the lock device 60 includes a cylinder actuator 61 and a pair of actuator arms 62*f* and 62*b* which are operatively coupled to the cylinder actuator 61 through pins 63*f* and 63*b*, respectively. Each of the actuator arms 62f and 62b has a distal end which moves between an advanced position and a retracted position. Thus, when the distal ends of the actuator arms 62f and 62b are set in the advanced position by the cylinder actuator 61, these distal ends come into engagement with the pair of support rollers 31 to lock the support rollers 31, whereby the support rollers 31 are held to be unrotatable. On the other hand, when the actuator arms 62f and 62b are moved to the retracted position by the cylinder actuator 61 to thereby have the distal ends of the actuator arms 62f and 62b to be separated away from the support rollers 31, the lock condition is released and thus the support rollers 31 are set to be rotatable. The lock device 60 is provided to lock or unlock the support rollers 31 such that the support rollers 31 are locked when a vehicle is moved into or out of the present wheel examining system.

FIG. 2 illustrates the overall structure of a wheel examining system provided with four of the wheel examining apparatuses 10 shown in FIG. 1 for examining the four wheels of a 4-wheel vehicle one by one or at the same time and constructed in accordance with another embodiment of the present invention. In the wheel examining system shown in FIG. 2, there is provided a pair of front wheel examining apparatuses 10fl and 10fr as spaced apart from each other in the transverse direction and another pair of rear wheel examining apparatuses 10bl and 10br as spaced apart from each other in the transverse direction. As described previously, each of the wheel examining apparatuses 10 is mounted on the pair of guide rails 13f and 13b slidably in the transverse direction, and thus paired wheel examining apparatuses 10bl and 10br or 10fl and 10fr may move close to each other or separated away from each other in the transverse direction. As described previously, between the paired wheel examining apparatuses 10bl and 10br or 10fl and 10fr, the respective support rollers 31 of the left and right wheel examining apparatuses 10 are operatively interconnected by the equalizer 12. In addition, the paired contact roller assemblies 47 of each of the wheel examining apparatuses 10 are operatively interconnected by the pantagraph 54. Thus, the support rollers 31 of the left and right wheel examining apparatuses 10 are always located symmetrically with respect to the longitudinal center line CL of the system, and the geometrical centers of the left and right wheels which are determined when the wheels are clamped by the contact roller assemblies 47 are also located equidistant from the system center line CL.

In the embodiment shown in FIG. 2, a pair of rear wheel examining apparatuses 10bl and 10br is mounted on a slide table 82 which is slidably mounted on a pair of guide rails 81l and 81r laid down at the bottom of the pit P and extending in parallel each other and also with the system center line CL. A pair of front wheel examining apparatuses 10fl and 10fr is fixedly mounted on the bottom of the pit P. Thus, the pair of rear wheel examining apparatuses 10bl and 10br is movable along the guide rails 81l and 81r in the longitudinal direction relative to the pair of fixedly provided front wheel examining apparatuses 10fl and 10fr. Although not shown in FIG. 2, there is also provided a lock mechanism for locking the slide table 82 at a desired location along the guide rails 81l and 81r. With this structure, even if wheels of a vehicle having a different wheel base distance are to be examined, the slide table 82 may be moved appropriately to set the distance between the front and rear wheel examining apparatuses 10 at the wheel base distance of the vehicle to be examined, and thus all of the wheels of the vehicle may be examined at the same time.

FIG. 3 functionally illustrates the wheel inclination measuring system of the wheel examining system of FIG. 2. Here, it is to be noted that the term "wheel inclination" used in the present specification indicates any inclination of a wheel with respect to a predetermined reference line, i.e., the angle formed between a wheel and a predetermined reference line, and, in particular, it includes the toe, camber, caster, angle of wheel wiggling and steered wheel angle, though these are simply illustrative examples. As diagrammatically shown in FIG. 3, each of the four wheels of a 4-wheel vehicle is located on the corresponding one of the four wheel examining apparatuses 10 of the system. In this case, each wheel is placed on the pair of support rollers 31 of the corresponding wheel examining apparatus 10 and the opposite side surfaces of each wheel are clamped by the two pairs of contact rollers 47rf–47rb and 47lf–47lb. Thus, each wheel is supported to be rotatable around its own rotating axis and its geometrical center is located in alignment with the center of the angular sensor 56. The angular sensor 56 of each of the wheel examining apparatuses 10 supplies a detection signal to a process/display unit 10 where the detection signal thus supplied is processed in accordance with a predetermined program to thereby display its result. The process/display unit 80 is, for example, is comprised of a microprocessor or microcomputer and a display device such as a CRT.

In the system shown in FIG. 3, when the right and left contact rollers 47fr–47rb and 47lf–47lb are brought into pressure contact with the opposite side surfaces of a wheel, respectively, in each of the wheel examining apparatuses 10, the geometrical center of the wheel thus clamped is aligned with the center of the angular sensor 56, so that under the circumstances a angular detection signal of the wheel obtained from the angular sensor 56 is appropriately processed to thereby obtain the toe angle of the wheel in a static state. In this manner, in accordance with the present invention, the toe angle of each of the wheels can be determined in a static state, i.e., the wheel being not in rotation around its own axis. Furthermore, although not shown in FIG. 3, as shown in FIG. 1 by the phantom line, a vertically extending support lever 48 may be provided as mounted on the outer contact roller assembly 47r with an additional contact roller 49 provided at the tip end of the support lever 48 for detecting the camber of the wheel, i.e., the degree of inclination of the wheel 1 with respect to the vertical line. The detected information may also be supplied to the process/display unit 80 to measure and display the detected camber of the wheel 1. Preferably, the additional contact roller 49 is also rotatably mounted at the forward end of the support lever 48 such that the roller 49 is in rolling contact with the outer side surface of the wheel 1 in the circumferential direction thereof.

In the present system, since each wheel is placed on a pair of support rollers 31 rotatably around its own rotating axis, the above-described toe and camber may also be measured dynamically, i.e., with the wheel in rotation around its own rotating axis. In such dynamic measurements, it may take either one of the external driving type in which the support roller 31 is driven to rotate to thereby rotate the wheel 1 thereon and the self-driving type in which the support roller 31 is set to be freely rotatable and the wheel 1 riding thereon is driven to rotate by an engine of a vehicle.

Recently, an automobile provided with a 4-wheel steering device is drawing much attention, and in such a 4-wheel steering vehicle, the rotation of a steering wheel is transmitted to all of the four wheels. In such a 4-wheel steering vehicle, the angle follower type is of particular interest, in which case the orientation of the rear wheels is determined following the orientation of the front wheels in accordance with a predetermined program. That is, for example, when gradually turning the steering wheel to the right, the front wheels are gradually turned to the right in accordance therewith; however, the manner of steering of the rear wheels somewhat differ. That is, in this case, the rear wheels initially turn to the right over a slight angle (e.g., 1° to the right); however, as the steering wheel is turned to the right beyond a first predetermined angle (e.g., 15°–16° to the right), the front wheels are turned to the right accordingly, but the rear wheels are gradually turned to the left (e.g., 5° at maximum to the left).

In this manner, in 4-wheel vehicles, there are those in which the orientation of the rear wheels changes depending on the changes in orientation of the front wheels in accordance with a predetermined program. In such a case, the front and rear wheels are required to vary their angular orientation in a particular manner in accordance with the operation of the steering wheel. In the system shown in FIG. 3, by previously storing such a program for determining how to change the orientation of each of the wheels depending on the rotation of the steering wheel in a memory of the process/display unit 80, the steering performance of each of the wheels can be examined. In this case, in the present system, since the geometrical center of each wheel is aligned in position with the center of the angular sensor 56, the examination can be carried out at high accuracy. Furthermore, since each wheel is placed on a pair of support rollers 31, the wheel can be examined dynamically, i.e., with the wheel in rotation. Such a dynamic test is extremely advantageous since it is very similar to the actual running condition of a vehicle. As described previously, the dynamic test may take either one of the external driving type and the self-driving type. Although not shown in FIG. 3, it may also be so structured that a detector for detecting the angular position of the steering wheel of a vehicle to be tested is provided and a detection signal from this detector is also supplied to the process/display unit 80.

It is to be noted that in the system shown in FIG. 3 all of the four wheels of a 4-wheel drive vehicle can be tested at the same time. In the case of a 4-wheel drive vehicle, there is a case in which a viscous coupling is provided between the differential assembly for the front wheels and the differential assembly for the rear wheels. In such a case, if a relative rotation occurs between the shafts connecting the respective differential assemblies, all of the four wheels are operatively interconnected. Thus, in the case when the wheels of a 4-wheel drive vehicle are to be examined in a dynamic test mode of the external driving type, it is necessary to rotate each of the wheels such that the above-described relative rotation does not occur. The direction of rotation of the wheels under such circumstances is indicated by arrows 85 in FIG. 3. That is, in this mode of operation, the front wheels are driven to rotate in the opposite directions, i.e., 85*fl* and 85*fr*, and in addition the right or left front and rear wheels are also driven to rotate in the opposite directions, i.e., 85*fr* and 85*br* or 85*fl* and 85*bl*. By driving to rotate the four wheels in their respective independent directions in this manner, each of the wheels may be driven to rotate independently so that each of the four wheels of a 4-wheel drive vehicle can be examined dynamically in a mounted condition.

Figure 6A:
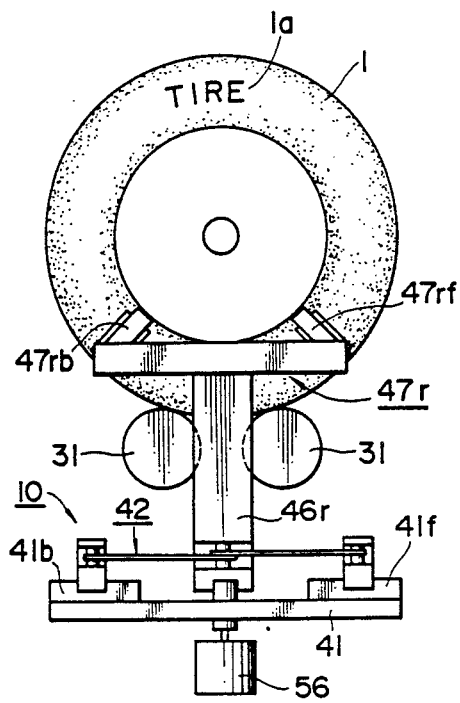
FIGS. 6a through 6c are schematic illustrations useful for understanding the operation of the wheel examining apparatus 10 shown in FIG. 1.
Figure 6B:
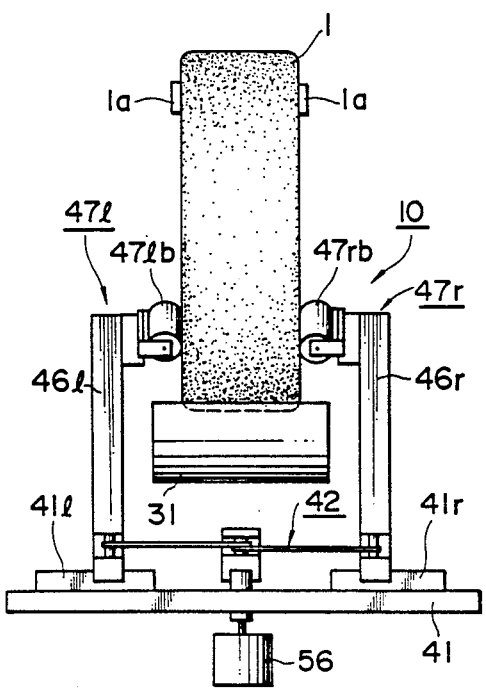
Figure 6C:
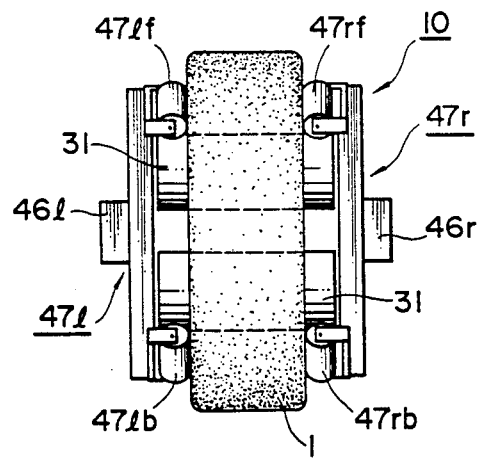

FIGS. 6a through 6c are schematic illustrations which diagramatically show the present wheel examining apparatus 10 of FIG. 1. As shown in FIGS. 6a through 6c, a wheel 1 to be examined is placed on a pair of support rollers 31 as being mounted on a vehicle and the wheel 1 is rotated around its rotating axis as riding on the pair of support rollers 31. The opposite side surfaces of the wheel 1 are clamped by right and left contact rollers 47*rf*-47*rb* and 47*lf*-47*lb* which are pressed against the side surfaces of the wheel 1 in rolling contact therewith in the circumferential direction. As a result, the geometrical center of the wheel 1 is located at the center between the right and left contact rollers in pressure contact with the opposite side surfaces of the wheel 1 and is in alignment with the center of the angular sensor 56. With this structure, the toe of the wheel 1 can be determined while maintaining the wheel 1 in rotation, and furthermore the amount of wiggling of the wheel 1 in the transverse direction (i.e., angle or amplitude) can also be determined accurately.

Figure 15:
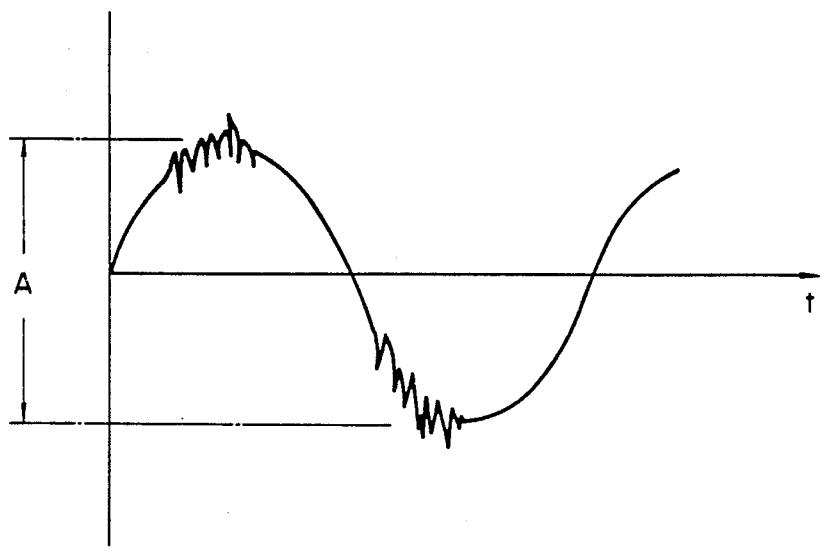
FIG. 15 is a graph showing a representative detection signal obtained when measuring the amplitude of wiggling of a wheel based on the information from one side wall of a wheel.

That is, conventionally, the amount of wiggling of a wheel was measured using a contact type or non-contact type sensor at one side surface of a wheel. In this case, however, it was subjected to deformations (distortions) in the side surface of a wheel or imprinted characters 1a on the side surface of a wheel as shown in FIG. 6a, the amount of wiggling of a wheel in the transverse direction, i.e., the amplitude of wheel wiggling, could not be measured at high accuracy. For example, if the amount of wiggling of a wheel 1 in the transverse direction is measured using a contact roller in rolling contact with one side surface of the wheel 1, there is obtained such a detection signal as shown in FIG. 15. The resulting detection signal includes not only a sinusoidal primary signal which indicates the amount of wiggling of the wheel 1 in the transverse direction, but also a high frequency secondary component which is produced, for example, by distortions of the wheel 1 and in particular by the characters 1a imprinted on the side surface of the wheel 1. Thus, if such a secondary component were located at or in the vicinity of the peak or valley of the sinusoidal primary component, the transverse wiggling amplitude A cannot be determined accurately.

Figure 7:
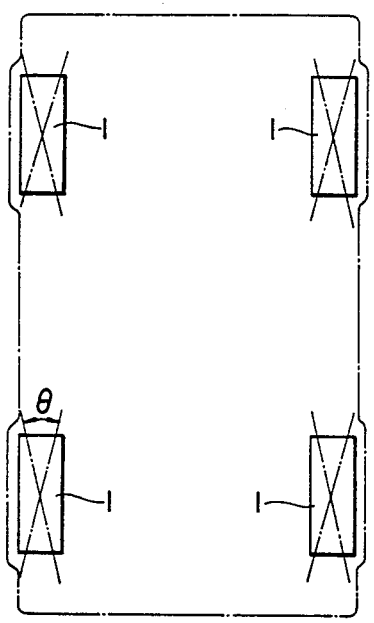
FIG. 7 is a schematic illustration showing the angle θ of wiggling of each of four wheels of a 4-wheel vehicle.

As shown in FIG. 7, in accordance with the present invention, the angle $\theta$ of wiggling of each of the wheels 1 in the transverse direction can be measured by the corresponding angular sensor 56 by rotating the wheel 1. In addition, since the outer diameter of the wheel 1 is previously known, the amount of wiggling of a wheel 1 in the transverse direction, in particular its amplitude, can be accurately determined from the measured angle $\theta$ and the outer diameter of the wheel 1. With the structure of the present invention, since a wheel 1 is clamped symmetrically by a pair of right and left contact rollers from both sides, the distortions of the wheel 1 or influences of the characters 1a are cancelled between the right and left surfaces so that these present no particular problem. The characters 1a of a wheel 1 are mostly the name of a tire manufacturer and such characters 1a are normally provided symmetrically on both sides of the wheel 1. The deformation of a wheel includes bulging at the lower portion in the transverse direction depending on the pressure in the tire, and such deformation of a wheel in the transverse direction is also symmetrical with respect to the center plane of the wheel. Accordingly, by clamping a wheel 1 by right and left contact rollers from both sides as in the present invention, these undesired parameters may be cancelled and thereby suitably eliminated. Thus, it is possible to accurately measure the amount of wiggling of a wheel 1 in the transverse direction. Moreover, when the amount of wiggling of a wheel has exceeded a predetermined value, it may be decided that the mounting condition of the wheel 1 is improper and thus needs to be adjusted.

Figure 9:
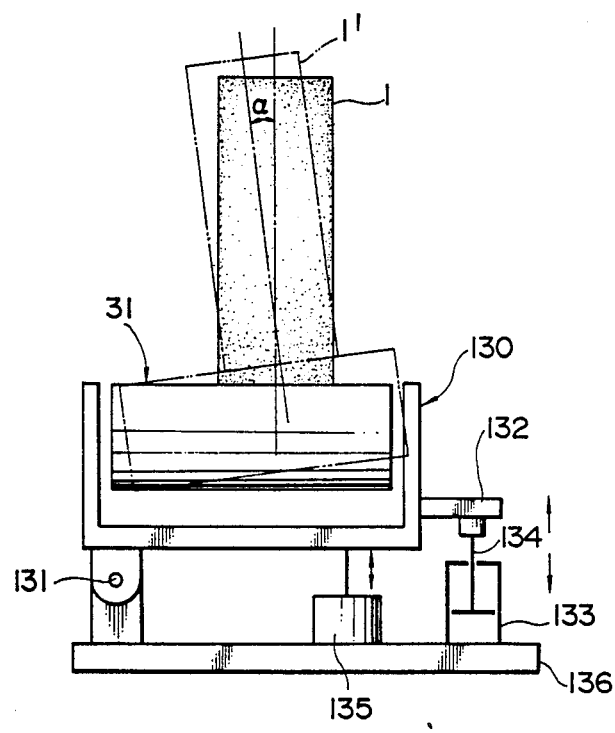
FIG. 9 is a schematic illustration showing a structure for measuring the camber of a wheel which is suitable for application to the wheel examining apparatus 10 of FIG. 1.

FIG. 9 is a schematic illustration showing another structure of the support roller assembly 30 shown in FIG. 1. That is, a support roller assembly 130 shown in FIG. 9 is generally U-shaped similarly with the support roller assembly 30 of FIG. 1 and includes a pair of rotatably supported support rollers 31 arranged in parallel. However, the support roller assembly 130 is not directly attached to the upper rotating shaft 27; instead, the support roller assembly 130 is pivotally mounted on a base plate 136 which is fixedly attached to the top end of the upper rotating shaft 27. That is, one side of the support roller assembly 130 is pivotally connected to the base plate 136 through a pivot pin 131 and a projection 132 projects from the opposite side of the support roller assembly 130. And, below the projection 132 is disposed a cylinder actuator 133 which is fixedly mounted on the base plate 136 with a rod 135, which is retractable into the cylinder actuator 133, having its forward end fixedly attached to the projection 132. In addition, an angular detector 135 is interposed between the support roller assembly 130 and the base plate 136.

Thus, with the above-described structure, the camber angle (alpha) of a wheel 1 can be measured by operating the cylinder actuator 133 to set the rotating axis of the support roller 31 to be in parallel with the rotating axis of the wheel 1 mounted on a vehicle to be examined and reading the value from the angular detector 135 at that condition. As an alternative structure, a compression spring having an appropriate spring constant may be interposed between the projection 132 and the base plate 136 in place of the cylinder actuator 133. In this alternative structure, when the wheel 1 is placed on the support rollers 31, the rotating axis of the wheel 1 is automatically set to be in parallel with the rotating axis of the support rollers 31 so that the camber angle of the wheel 1 can be detected by reading the value from the angular detector 135 at that condition.

Figure 10:
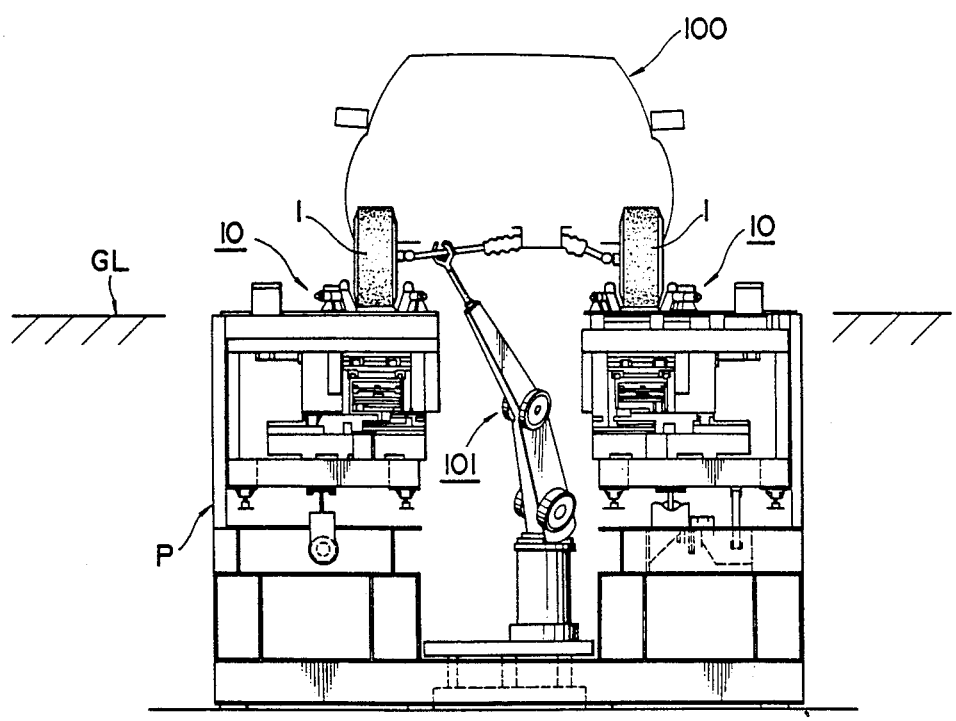
FIG. 10 is a schematic illustration showing an adjusting system for adjusting the mounting condition of each of the wheels by means of a robot 101 in accordance with the results obtained by the wheel examining apparatus 10 of FIG. 1.

FIG. 10 illustrates an adjusting system for adjusting the degree of inclination of each of the wheels 1 by a robot 101 in accordance with the measured results obtained by the present wheel examining apparatus 10. That is, in the present adjusting system, as shown in FIG. 3, the degree of inclination of each of the wheels 1 is detected and its detected value is supplied into the process/display unit 80 to be processed in accordance with a predetermined program, and thereafter a correction value for the inclination of each of the wheels 1 is supplied to the robot 101, so that the robot 101 adjusts the degree of inclination of each of the wheels 1 in accordance with such correction values. In the illustrated embodiment, the robot 101 is located in the pit P which is defined below a floor level GL of the work site.

Figure 11:
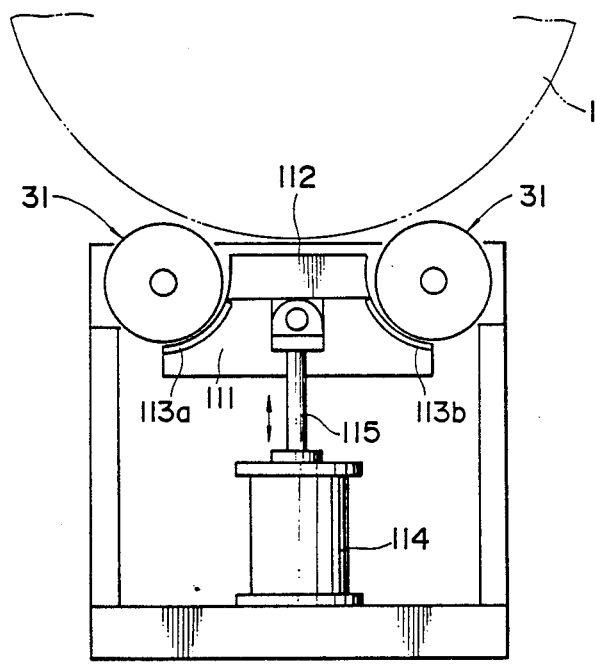
FIG. 11 is a schematic illustration showing a lock device capable for locking and unlocking the support rollers 31 of the wheel examining apparatus 10 of FIG. 1 and suitable for application thereto.

FIG. 11 is a schematic illustration showing the structure of another embodiment of a lock mechanism suitable for use in the present wheel examining apparatus 10 for locking and unlocking the support rollers 31. In the structure shown in FIG. 1, there is provided a lock mechanism 60 for locking the support rollers 31 when a wheel 1 runs into the support rollers 31 or runs out of the support rollers 31. In this lock mechanism 60, it is so structured that the tip ends of the pair of arms 62f and 62b are directly brought into contact with the pair of support rollers 31 to lock the support rollers 31. On the other hand, in the structure shown in FIG. 11, a vertically movable lifter plate 111 is disposed between the pair of support rollers 31 and the lifter plate 111 is pivotally connected to the tip end of a rod 115 which is retractable into a cylinder actuator 114. In the illustrated embodiment, the lifter plate 111 is approximately trapezoidal in cross section and provided with a center lift surface 112 and a pair of curved brake surfaces located on the opposite ends of the center lift surface 112. Each of the curved brake surfaces is provided with a brake shoe 113a or 113b. Thus, when the rod 115 is moved upward by the cylinder actuator 114, the brake shoes 113a and 113b are brought into pressure contact with respective support rollers 31 to hold these support rollers 31 stationary and thus unrotational. Under this condition, a wheel 1 is caused to run to be located on the lift surface 112. Then, the cylinder actuator 114 is operated to cause the rod 115 to move downward so that the brake shoes 113a and 113b are separated away from the respective support rollers 31 to thereby set the support rollers 31 to be freely rotatable, while the wheel 1 comes to be supported on this pair of support rollers 31. With the lift plate 111 located at its lower position in this manner, the lift surface 112 is not brought into contact with the wheel 1.

Figure 12:
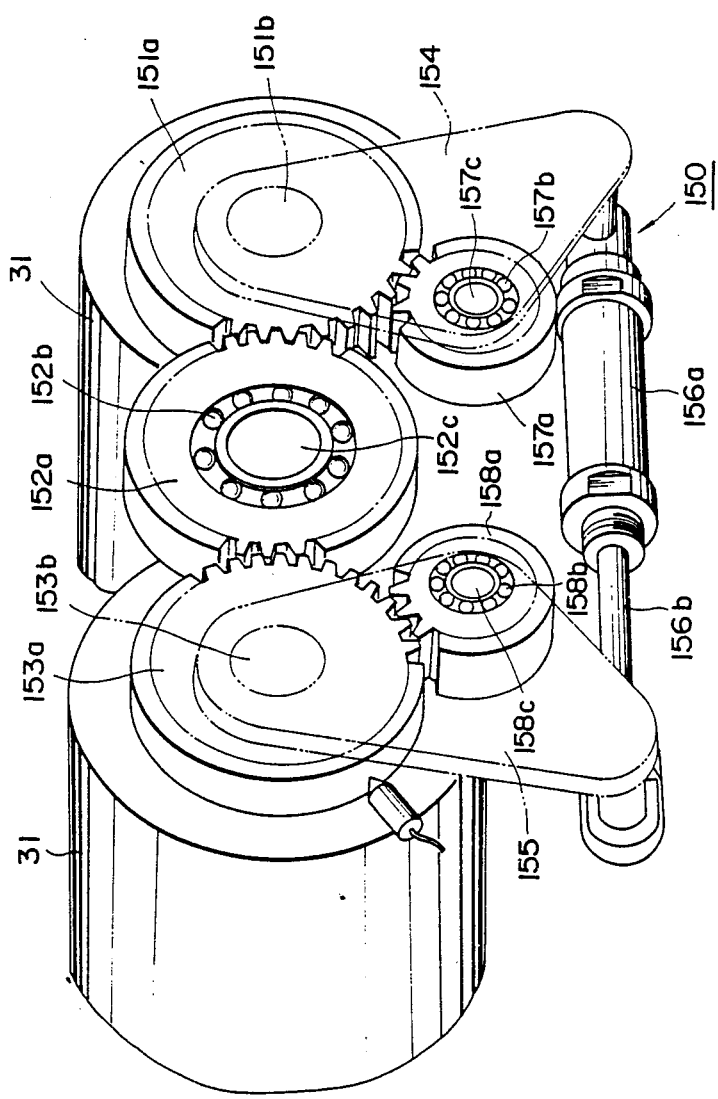
FIG. 12 is a schematic illustration showing a lock device capable of locking and unlocking two rotatable rollers simultaneously and suitable for application to the wheel examining apparatus 10 of FIG. 1.

FIG. 12 illustrates a lock device 150 for locking and unlocking two rotatably supported rollers at the same time, which is particularly suitable for application to the present wheel examining apparatus 10 as an alternative structure of the lock device 60. FIG. 12 shows a specific structure when the present lock device 150 is applied to the wheel examining apparatus 10 as its lock device 60.

As shown in FIG. 12, an end gear 153a is integrally provided at one end of one of the pair of support rollers 31 and another end gear 151a is integrally provided at one end of the other of the pair of support rollers 31. Thus, the end gears 153a and 151a are rotatable integrally together with the respective support rollers 31. Also provided is an intermediate gear 152a which is located between and in mesh with both of the end gears 151a and 153a. The intermediate gear 152a is supported at a predetermined position on an intermediate shaft 152c through a bearing 152b. Thus, for example, when a rotating driving force is applied to one of the support rollers 31 in a predetermined direction, the both of the support rollers 31 rotate in the same direction at equal speed via the intermediate gear 152a.

A left actuator arm 155 is pivotally connected to a rotating shaft (not shown) of the end gear 153a through a bearing 153b and a right actuator arm 154 is pivotally connected to a rotating shaft (not shown) of the end gear 151a through a bearing 151b. Thus, these left and right actuator arms 155 and 154 normally depend downward. A shaft 158c is planted in the middle of the left actuator arm 155 and the shaft 158c rotatably supports a lock gear 158a through a bearing 158b. It is to be noted that the lock gear 158a is disposed at a position to maintain it to be meshed with the end gear 153a. On the other hand, a shaft 157c is planted in the middle of the right actuator arm 154 and this shaft 157c rotatably supports a lock gear 157a through a bearing 157b. The lock gear 157a is disposed such that it is maintained to be meshed with the end gear 151a.

The lock device 150 also includes a cylinder actuator 156a which has its base end pivotally connected to the bottom end of the right actuator arm 154. The cylinder actuator 156a includes a retractable rod 156b which has its tip end pivotally connected to the bottom end of the left actuator arm 155.

With the above-described structure, when the rod 156b projects out of the cylinder actuator 156a as shown in FIG. 12, the lock gears 157a and 158a are only in mesh with the respective end gears 151a and 153a, whereby no locking function is provided. Thus, the condition shown in FIG. 12 indicates an unlocked condition, in which the two support rollers 31 rotate in the same direction at equal speed through the intermediate gear 152a. On the other hand, when the cylinder actuator 156a is operated to have the rod 156b retracted into the cylinder actuator 156a, the right actuator arm 154 pivots clockwise so that the lock gear 157a is brought into mesh with both of the end gear 151a and the intermediate gear 152a. At the same time, the left actuator arm 155 is pivotted counterclockwise so that the lock gear 158a is brought into mesh with both of the end gear 153a and the intermediate gear 152a. As a result, under this condition, since the respective lock gears 157a and 158a receive rotating forces opposite in direction and thus the rotation is prevented, whereby the support rollers 31 are maintained to be unrotatable. It is to be noted that in the structure shown in FIG. 12, two lock gears 157a and 158a are provided; however, in principle, it is only necessary to provide only either one of these two lock gears 157a and 158a.

Furthermore, it may also be so structured to connect the tip ends of the actuator arms 62f and 62b of the lock device 60 of FIG. 1 to the bottom ends of the left and right actuator arms 154 and 155 shown in FIG. 12. With this structure, the two support rollers 31 may be simultaneously set in a lock state or an unlock state simply by setting at least one of the lock gears 157a and 158a to be in mesh with both of the end gear 151a or 153a and the intermediate gear 152a or to be released from the mesh with the intermediate gear 152a.

Figure 13:
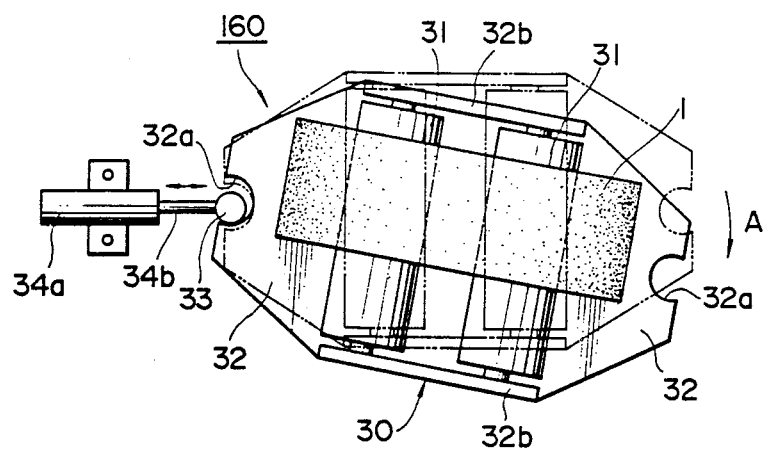
FIGS. 13 and 14 are schematic illustrations showing a rotating object thrust absorbing apparatus for absorbing a thrust of a rotating object, such as a wheel, and suitable for application to the wheel examining apparatus 1 of FIG. 1.
Figure 14:
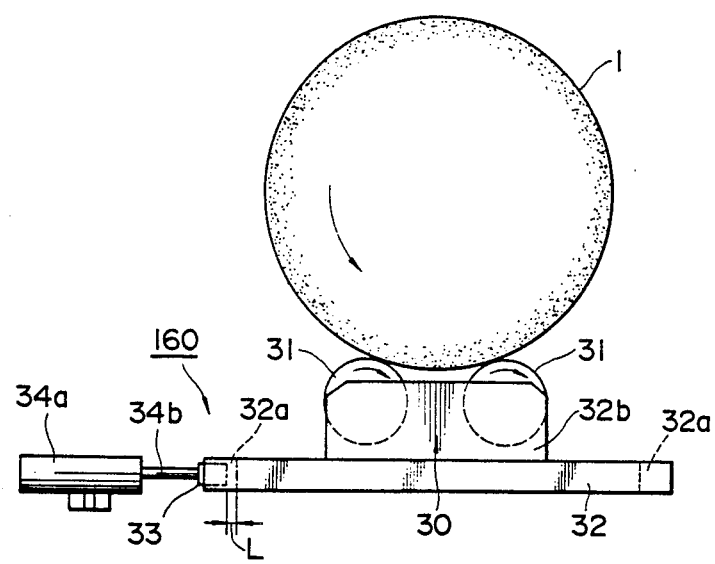

FIGS. 13 and 14 illustrate a rotating wheel thrust absorbing apparatus 160 constructed in accordance with a further embodiment of the present invention, which is particularly suitable for application to the present wheel examining apparatus 10. In the structure shown in FIG. 1, this rotating wheel thrust absorbing system 160 is incorporated in the support roller assembly 30. As shown in FIGS. 13 and 14, the support roller assembly 30 has a generally U-shaped cross-sectional shape and it includes a flat bottom wall 32 and a pair of side walls 32b which extend upright from the opposite sides of the flat bottom wall 32. A pair of support rollers 31 is rotatably arranged in parallel as extending between the pair of side walls 32b and these support rollers 31 may support thereon a wheel 1 of a vehicle.

The bottom wall 32 is formed with an open engaging hole 32a at its front end and also at its rear end. Also provided is a cylinder actuator 34a fixed in position and the cylinder actuator 34a has a retractable rod 34b whose tip end is provided with an engaging disc 33. When the cylinder actuator 34a is operated to project the rod 34b out of the cylinder actuator 34a, the engaging disc 33 at the tip end of the rod 34b comes into engagement with the engaging hole 32a of the support roller assembly 30. FIGS. 13 and 14 illustrate the condition in which such an engagement has been established. Although not shown in FIGS. 13 and 14 for the sake of brevity, the support roller assembly 30 is provided to be freely movable in a plane, such as a horizontal plane. For example, the bottom wall 32 of the support roller assembly 30 is rotatably mounted on the upper rotating shaft 27 which is supported to be movable in a horizontal plane or placed on a number of balls supported on the top surface of a support plate. Thus, as shown in FIGS. 13 and 14, with the engaging disc 33 engaged in the engaging hole 32a, the support roller assembly 30 may pivot in a horizontal plane around the engagement between the engaging disc 33 and the engaging hole 32a.

As shown in FIGS. 13 and 14, if the wheel 1 placed on the support rollers 31 is a wheel mounted on a vehicle, the so-called inclination, such as toe, is set in the wheel 1. Thus, the support roller assembly 30 is initially located at a predetermined straight position (as indicated by the dotted lines in FIG. 13). If a wheel 1 is placed on the support rollers 31 under this condition, the rotating axis of the wheel 1 is not in parallel with the rotating axis of the support rollers 31 and an inclination angle is defined between these two rotating axes. Accordingly, when the wheel 1 is driven to rotate under this condition, there is produced a thrust between the wheel 1 and the support rollers 31 and as a result the support roller assembly 30 pivots in a horizontal plane in the direction indicated by the arrow A with the engaging disc 33 defined as the pivotal center. And, when the support roller assembly 30 has pivotted to the position where the rotating axis of the support rollers 31 is in parallel with the rotating axis of the wheel 1 (as indicated by the solid lines in FIG. 13), the pivotal movement of the support roller assembly 30 in the direction indicated by the arrow A ceases and the support roller assembly 30 is maintained at that position. That is, assuming that the initial position of the support roller assembly 30 indicated by the dotted lines in FIG. 13 corresponds to a position in parallel with the center line CL of the examining system, the angle defined between the initial position and an equilibrium position where the rotating axis of the support rollers 31 is in parallel with the rotating axis of the wheel 1 on the support rollers 31 corresponds to the toe angle of the wheel 1. Accordingly, with the provision of a detector for detecting the angle of pivotal motion of the support roller assembly 30, the toe angle of the wheel 1 can be detected. In the structure shown in FIGS. 13 and 14, a desired parameter of a wheel 1 (toe angle in the present embodiment) can be detected by absorbing any thrust produced between the wheel 1 and the support rollers 31 when the wheel 1 rotates around its own rotating axis while riding on the support rollers 31. It is to be noted that the present thrust absorbing apparatus should not be limited only for the measurement of a toe angle, but it is applicable for absorbing any thrust occurring between a rotating object, such as a wheel, and one or more support rollers for supporting thereon the rotating object by causing a relative pivotal motion between the rotating object and its supporting roller until the rotating axis of the rotating object becomes parallel with the rotating axis of the support roller.

In the structure shown in FIGS. 13 and 14, the engaging hole 32a is formed one at each of the front and rear ends of the bottom wall 32 of the support roller assembly 30. However, only one of such engaging holes 32a may be provided depending on the direction of rotation of the wheel 1. That is, only one such engaging hole 32a may be provided at the front end with respect to the direction of rotation of the wheel 1. However, as described previously, if four wheels are to be examined simultaneously in the case of a 4-wheel drive vehicle, since it is necessary to rotate the front and rear or right and left wheels in the opposite directions, it is preferable to provide such an engaging hole 32a one at each of the front and rear ends of the bottom wall.

Moreover, preferably, the diameter of the engaging hole 32a is set to be larger than the diameter of the engaging disc 33 by an amount equal to a predetermined clearance L. Such clearance L is determined as a distance between the tip end of the engaging disc 33 and the valley of the engaging hole 32a and this clearance L is defined as a sum of an allowable error in the wheel base distance of a vehicle to be examined and a displacement from the time when the rotation of the wheel 1 is initiated to the time when the equilibrium condition is obtained. In this manner, since the clearance L is set between the engaging disc 33 and the engaging hole 32a, an undesired force is prevented from being applied to the support roller assembly 30 and thus the support roller assembly 30 may absorb any thrust of the wheel 1 smoothly. It should also be noted that it is not always necessary for the engaging hole 32a to be partly open as in the embodiment shown in FIG. 13, it may also be formed as a complete through hole in the bottom wall 32. In this case, however, there must be provided a vertically movable engaging pin which is fitted into or moved out of such an engaging through hole. In this alternative structure, a predetermined clearance L should be set between the engaging hole and the engaging pin.

In the thrust absorbing apparatus shown in FIGS. 13 and 14, at least one of the two support rollers 31 may be driven to rotate to thereby cause the wheel 1 placed on the support rollers 31 to rotate, or, alternatively, the wheel 1 placed on the support rollers 31 may be driven to rotate by the engine mounted on the vehicle. Furthermore, when the support rollers 31 are driven to rotate, at least one of the support rollers 31 may be constructed as part of a motor, or, alternatively, a driving force may be transmitted to at least one of the support rollers 31 through a coupling or belt from an external motor.

Referring now to FIGS. 16 through 18, there is schematically shown the overall structure of a wheel examining system 201 of a 4-wheel vehicle constructed in accordance with a still further embodiment of the present invention. The illustrated wheel examining system 201 includes a generally rectangularly shaped frame 202 on which four (210fr, 210fl, 210br, 210bl) of a wheel examining apparatus 210 constructed in accordance with a still further embodiment of the present invention are arranged at four locations right and left and front and rear. Thus, when a 4-wheel vehicle, such as an automobile, to be examined rides on and is located in position on the present examination system 201 by running along a pair of ramps 203, the respective four wheels W are located in the respective wheel examining apparatuses 210. It is to be noted that for the purpose of brevity in description, the left and right ends of the frame 202 in FIG. 16 will be referred to as front and rear ends, respectively, in the following description.

A pair of guide rails 202a is disposed at the left and right corners of the front end portion of the frame 202 and a front base 204 is movably mounted on these guide rails 202a. The front base 204 is movable within a predetermined range along the guide rails 202a in the longitudinal direction of the frame 202. The front base 204 is operatively coupled to a handle 204a mounted at the front end of the frame 202, and the front base 204 moves in the longitudinal direction of the frame 202 relative thereto by rotating the handle 204a either clockwise or counterclockwise by grabbing by a hand. On the front base 204 is mounted a pair of wheel examining apparatuses 210fr and 210fl as arranged in the transverse direction which is normal to the longitudinal direction of the frame 202. Also provided is a front equalizer 205 which is operatively coupled to both of these front wheel examining apparatuses 210fr and 210fl for positioning these right and left front wheel examining apparatuses 201fr and 210fl symmetrically with respect to the center line of the system. Thus, by moving the front base 204 in the longitudinal direction relative to the frame 202, the pair of front wheel examining apparatuses 210fr and 210fl may be moved closer to or separated away from a pair of rear wheel examining apparatuses 210br and 210bl which are mounted on the frame 202. Thus, the distance L between the front and rear pairs of wheel examining apparatuses may be adjusted to a desired value. With this structure, the distance L may be set to the wheel base distance of a vehicle to be examined. Preferably, it is so structured that the front base 204 may be locked to the frame 202 at any desired location.

The equalizer 205 includes a front center shaft 205a, which defines the center position in the transverse direction in the front section, a rotating arm 205b, which is rotatably mounted on the center shaft 205a, and a pair of interconnection levers 205cr and 205cl which have their ends connected to the respective ends of the rotating arm 205b. The interconnection levers 205cr and 205cl are pivotally interconnected to respective L-shaped arms 11a each of which is fixedly attached to a later-described base plate provided in each of the left and right wheel examining apparatuses 210fr and 210fl. Similarly, the rear pair of wheel examining apparatuses 210br and 210bl mounted on the frame 202 is operatively coupled to each other by a rear equalizer 206 which is mounted on the frame 202. Similarly, the rear equalizer 206 includes a rear center shaft 206a, which defines the center position in the transverse direction in the rear section, a rotating arm 206b, which is mounted on the center shaft 206a to be rotatably therearound, and a pair of interconnection levers 206cr and 206cl, which are pivotally connected to the respective ends of the rotating arm 206b. And, these interconnection levers 206cr and 206cl are pivotally connected to L-shaped arms 211a each of which is fixedly attached to a later-described base plate provided within each of the left and right wheel examining apparatuses 210br and 210bl. Thus, a hypothetical straight line connecting the center shaft 205a of the front equalizer 205 and the center shaft 206a of the rear equalizer 206 corresponds to a center line extending in the longitudinal direction of the present examining system 201 and thus defines a reference line G of the present system 201. Since the front base 204 moves in the longitudinal direction along this reference line G, even if the front base 204 is moved along the guide rails 202a, this reference line G remains unaltered.

As shown in FIG. 16, each wheel examining apparatus 210 includes an inner roller assembly 216 and an outer roller assembly 217 which are provided to be movable to come closer together or separated away from each other along a predetermined straight line path and also to be rotatable around a predetermined rotating axis. In the illustrated embodiment, the inner roller assembly 216 is provided with a pair of toe detecting rollers 220ti, and the outer roller assembly 217 is provided with a pair of toe detecting rollers 220to and also with a camber detecting roller 220c. Since these roller assemblies 216 and 217 are provided to be movable to come closer together or separated away from each other, the inner toe detecting rollers 220ti and the outer toe detecting rollers 220to may move closer together or separated away from each other. As a result, by moving the inner and outer roller assemblies 216 and 217 closer together, the inner rollers 220ti and the outer rollers 220to may be brought into pressure contact with the inner and outer side surfaces of a wheel W from both sides to thereby have the wheel W clamped. With the wheel W clamped from both sides in this manner, the angle formed between the wheel W and the reference line G is detected to thereby detect the toe angle of the wheel W. In addition, the outer roller assembly 217 is provided with the camber detecting roller 220c, and when the outer toe detecting rollers 220to are brought into contact with the outer side surface of the wheel W, the camber detecting roller 220c is also brought into contact with the outer side surface of the wheel W at its upper portion, so that the camber angle of the wheel W can also be detected.

When the left and right (or inner and outer) toe detecting rollers 220ti and 220to are brought into pressure contact with the opposite side surfaces of the wheel W, the geometrical center of the wheel W is brought into alignment with the geometrical center of the wheel examining apparatus 210. Furthermore, since the left and right wheel examining apparatuses 210fr and 210fl or 210br and 210bl are arranged such that their geometrical centers are located symmetrically in the transverse direction with respect to the center points 205a and 206a of the respective equalizers 205 and 206, the left and right wheels W aligned with the center positions of the respective left and right wheel examining apparatuses 210 by clamping are located symmetrically in the transverse direction with respect to the reference line G of the present system 201.

Furthermore, in the system 201 shown in FIG. 16, each of the wheel examining apparatuses 210 is provided with a floating table 232 having a flat top support surface for supporting thereon a wheel W to be examined. As will be described more in detail later, the floating table 232 is so mounted that it is freely movable in a horizontal plane within predetermined limits and is also freely rotatable in the horizontal plane. Thus, when the wheel W supported on the floating table 232 is clamped by the inner and outer rollers 220ti and 220to from both sides, the wheel W, together with the floating table 232, moves freely translationally as well as rotationally in the horizontal plane defined by the floating table 232 to thereby carry out positioning of the wheel W.

Figure 19:
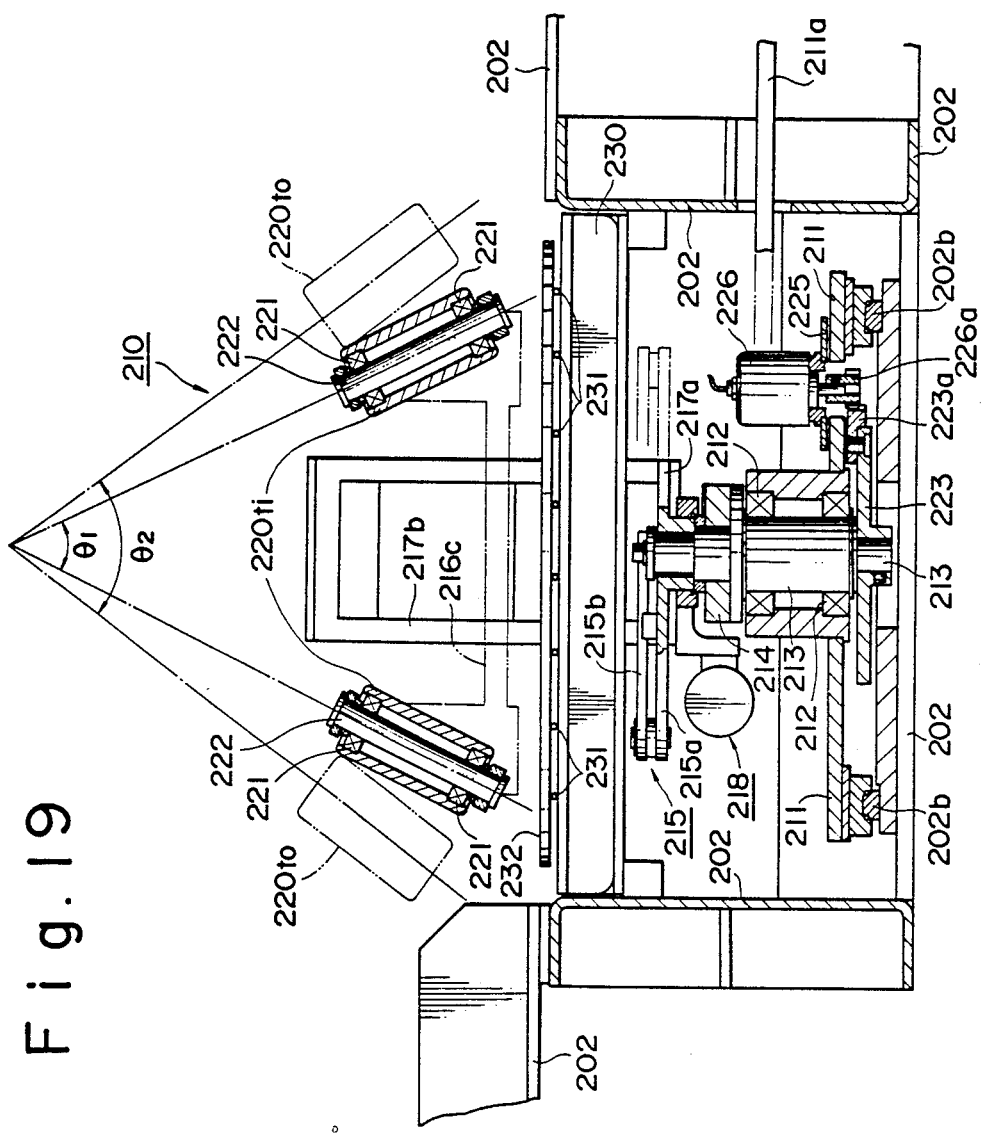
FIGS. 19 through 21 are schematic illustrations showing the detailed structure of a wheel examining apparatus 210 for use in the wheel examining system 201 of FIGS. 16 through 18 for examining an individual wheel.
Figure 20:
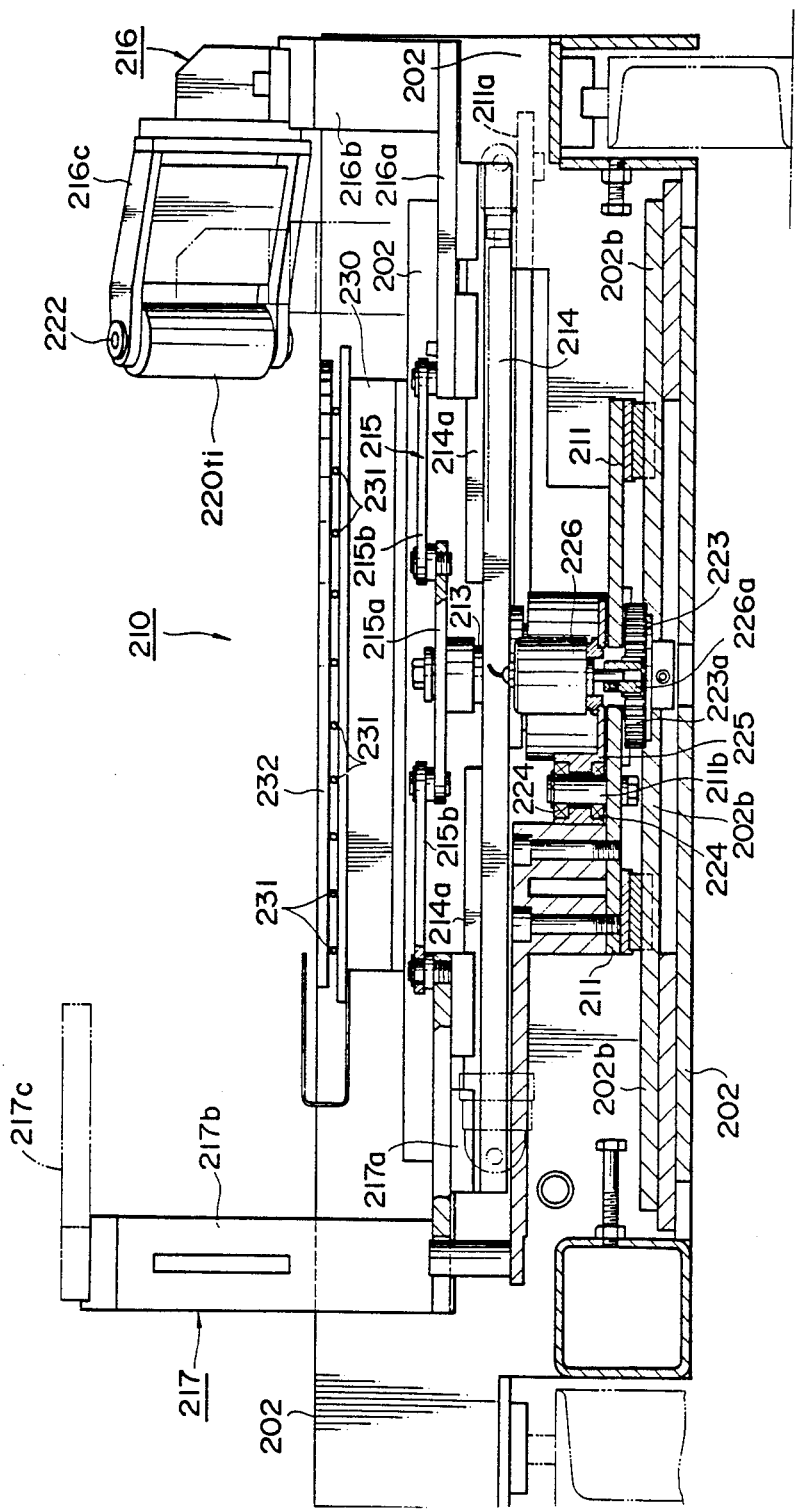
Figure 21:
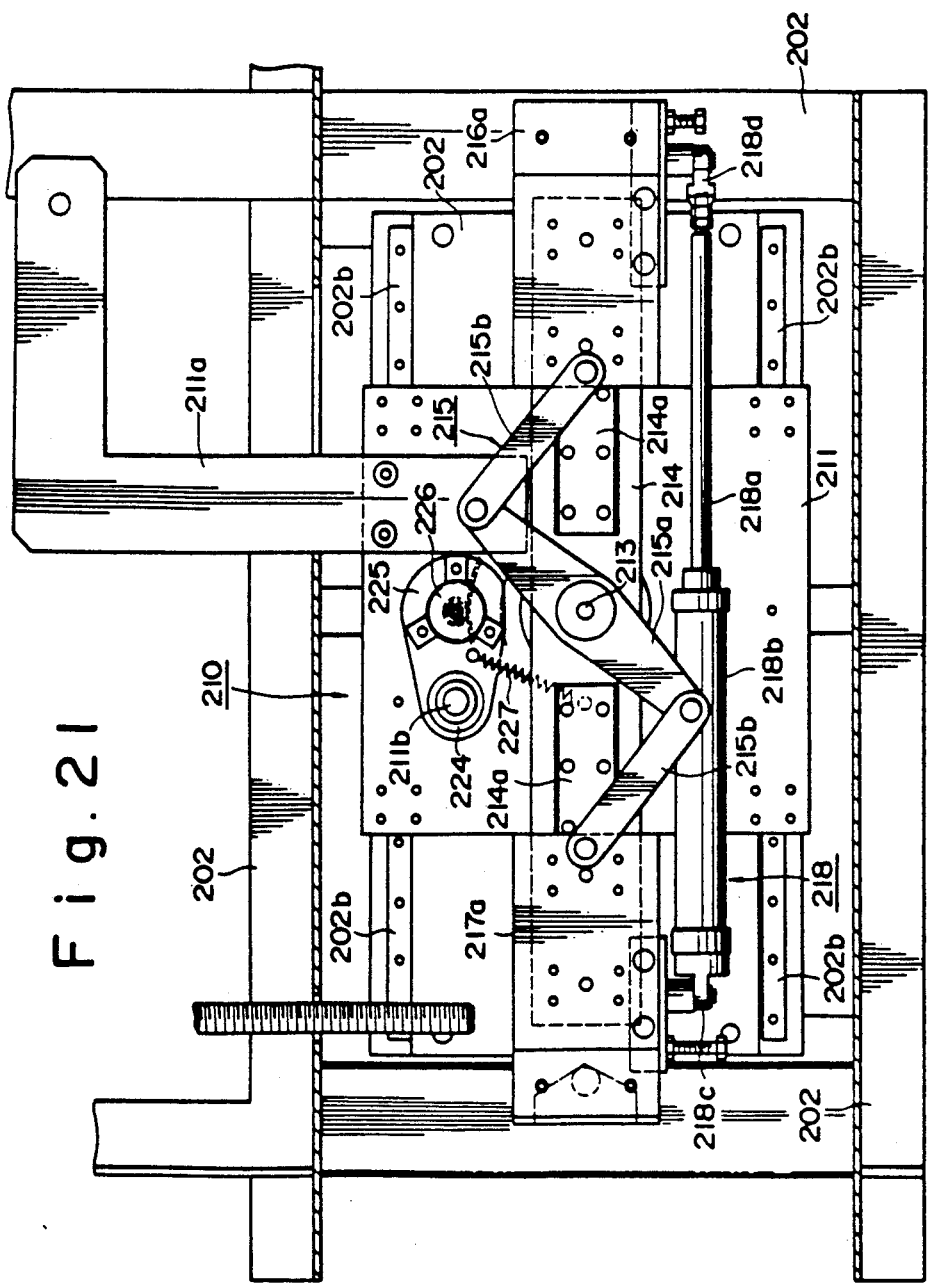

The detailed structure of the wheel examining apparatus 210 provided in the wheel examining system 201 shown in FIGS. 16 through 18 is illustrated in FIGS. 19 through 21. As shown in FIGS. 19 through 21, the wheel examining apparatus 210 generally includes an inner roller assembly 216, an outer roller assembly 217, an interconnection mechanism for operatively interconnecting these assemblies 216 and 217, and a floating table 232 for supporting thereon a wheel W to be examined. In the illustrated wheel examining apparatus 210, the inner roller assembly 216 includes an inner slider member 216a mounted on a balance plate 214 slidably movably in a longitudinal direction thereof, an inner column 216b extending vertically upward from one end of the inner slider member 216a, and an inner roller holder 216c fixedly attached at the top end of the inner column 216b.

The inner roller holder 216c holds a pair of toe angle detecting inner rollers 220ti freely rotatable. As is apparent from FIG. 19, this pair of inner rollers 220ti is arranged such that they may be brought into rolling contact with the lower portion of the inner side surface of a wheel W, preferably the lower portion of the inner side surface of the tire section of a wheel W, and the two rollers 220ti are so arranged that the rotating axes define a predetermined angle $\theta_1$. In the preferred embodiment, the crossing point of the two rotating axes of the rollers 220ti is located substantially at the rotating axis of the wheel W. As shown in FIG. 19, a rotating shaft 222 is fixedly attached to the roller holder 216c and the roller 220ti is mounted on the rotating shaft 222 freely rotatably through a pair of bearings 222.

Figure 22:
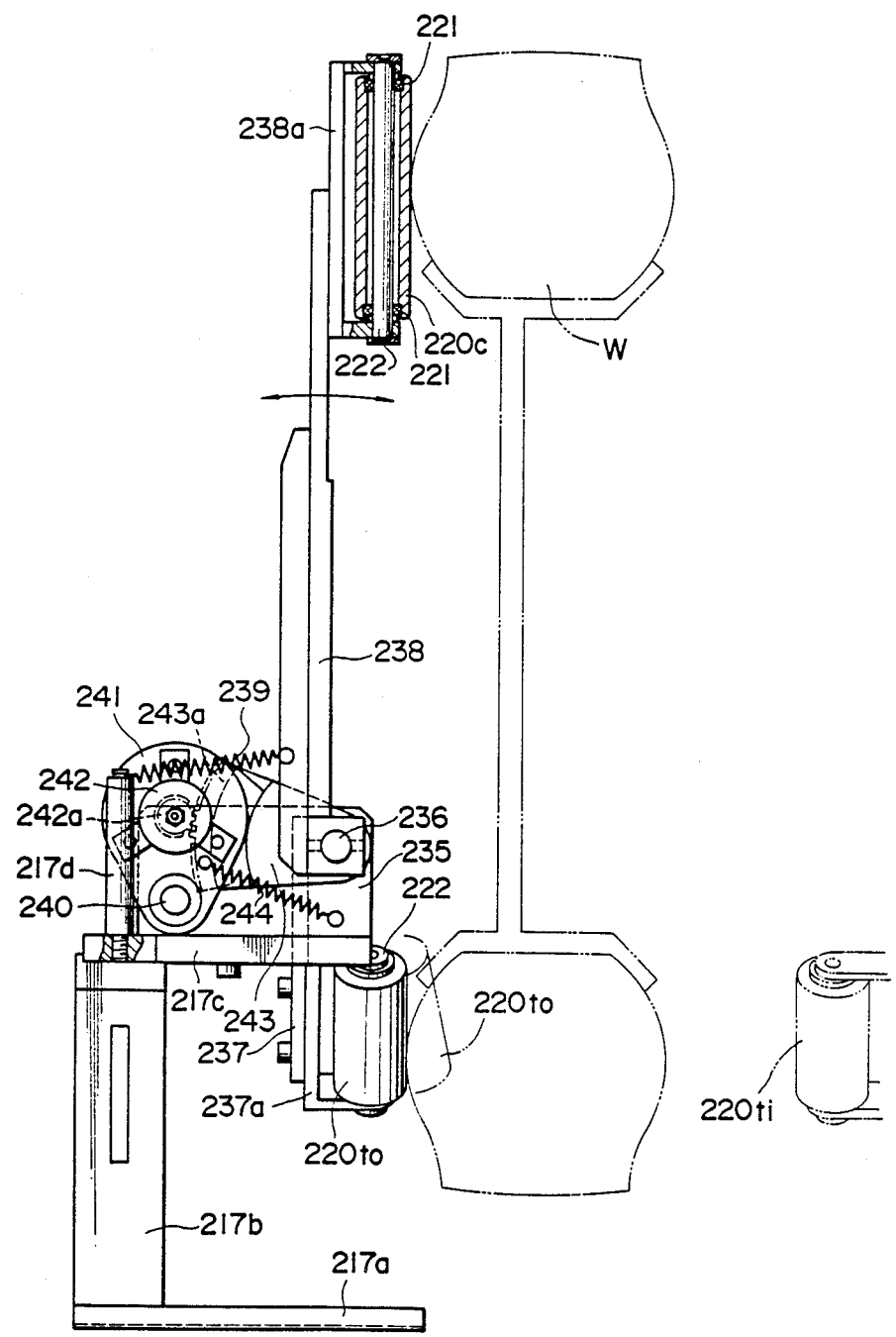
FIGS. 22 through 24 are schematic illustrations showing the detailed structure of a camber detecting device provided in the wheel examining apparatus 210.
Figure 23:
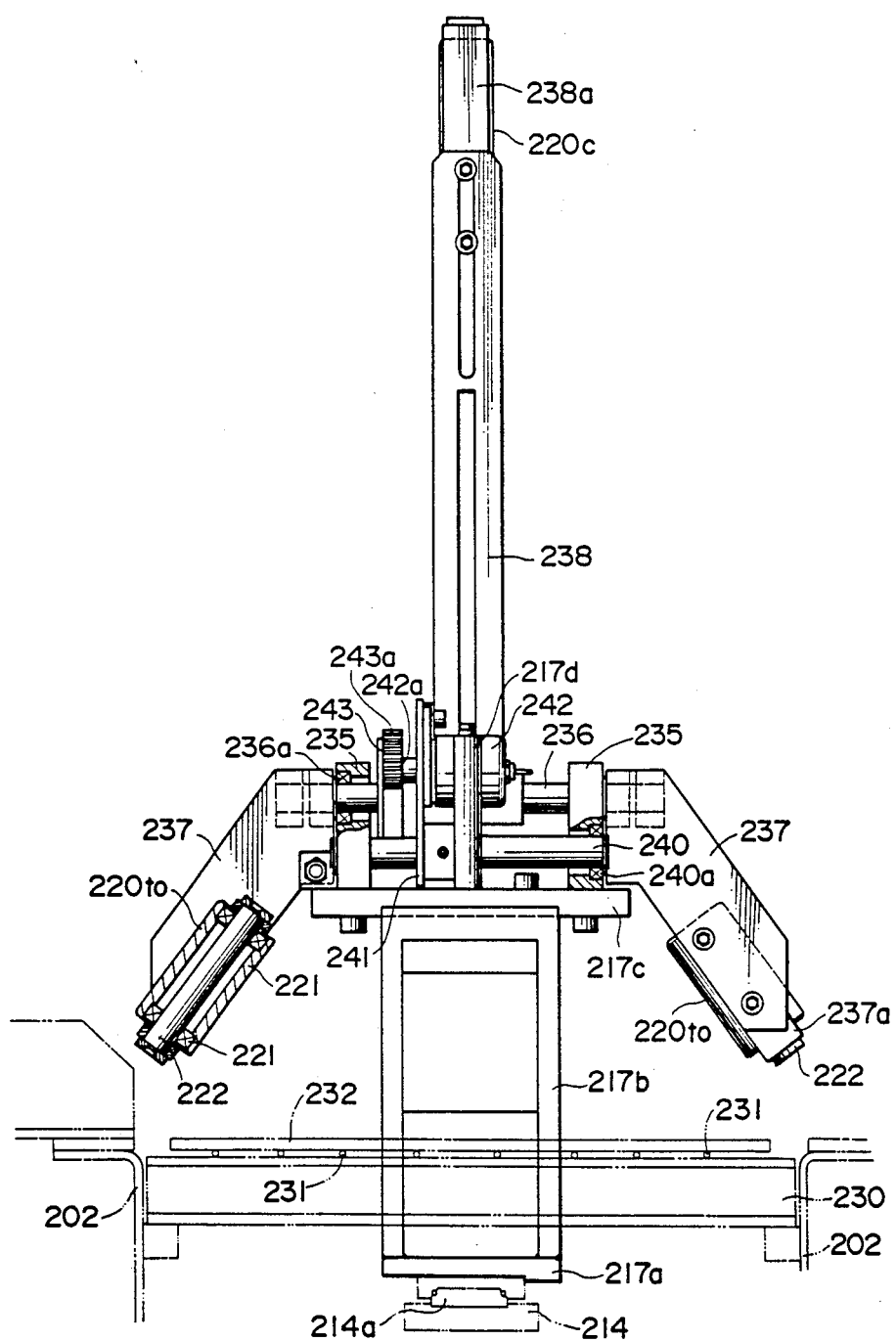
Figure 24:
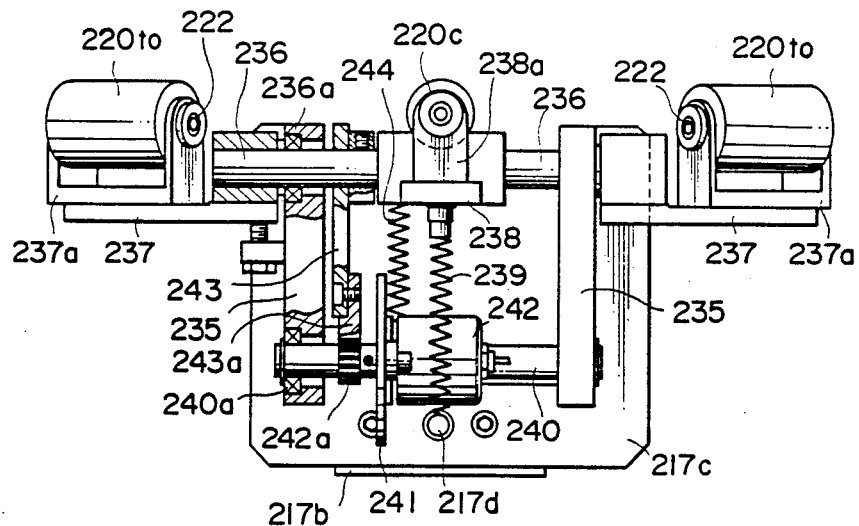

On the other hand, the outer roller assembly 217 includes an outer slider member 217a which is also mounted on the balance plate 214 slidably in the longitudinal direction thereof, an outer column 217b extending vertically upwardly from the outer end of the outer slider member 217a, a horizontal bracket 217c fixedly attached to the top end of the outer column 217b and a pair of inclined brackets 237 fixedly attached to the horizontal bracket 217c, whereby a pair of toe detecting outer rollers 220to is mounted on the pair of inclined brackets 237 through respective roller holders 237a. That portion of the structure of the outer roller assembly 217 which is located above the horizontal bracket 217c is illustrated in FIGS. 22 through 24.

The outer rollers 220to are arranged to be spaced apart from the inner rollers 220ti in the transverse direction normal to the reference line G of the present system 201 and the outer rollers 220to are located further away from the reference line G as compared with the inner rollers 220ti. These outer rollers 220to are also arranged to be brought into rolling contact with the lower portion of the outer side surface (preferably, the lower portion of the outer side surface of the tire section) of a wheel W. These outer rollers 220to are spaced apart from each other in a direction parallel with the reference line G and each of the outer rollers 220to is oriented such that the rotating axes of these inclined outer rollers 220to define a predetermined angle $\theta_2$. In the preferred embodiment, the merging point of these rotating axes of the inclined outer rollers 220to is located substantially at the rotating axis of the wheel W.

It is to be noted here that in the illustrated example the merging angle $\theta_1$ defined by the rotating axes of the inner rollers 220ti differs in value from the merging angle $\theta_2$ defined by the rotating axes of the outer rollers 220to. In particular, in the illustrated example, it is so set that $\theta_1$ is smaller than $\theta_2$. It has been newly found that such a staggered arrangement of the inner and outer rollers, i.e., asymmetrical arrangement of the inner and outer rollers, 220ti and 220to in this manner allows to clamp a wheel W more stably. In particular, since these inner and outer rollers 220ti and 220to are so arranged that they clamp the tire of wheel W from both sides, such a staggered arrangement of the inner and outer rollers 220ti and 220to provides a better and more stable clamping condition of the wheel W. In the illustrated example, the merging angle $\theta_1$ for the inner rollers 220ti is set to be smaller than the merging angle $\theta_2$ for the outer rollers 220to; however, $\theta_1$ may be set to be larger than $\theta_2$, as long as they differ. In addition, in the illustrated example, two rollers are provided for the inner and outer rollers; however, any desired number of rollers may be provided for the inner and outer rollers. In either case, the inner and outer rollers must be provided in a staggered arrangement when they are brought into pressure and rolling contact with the opposite side surfaces of a wheel W.

As is obvious from FIGS. 20 and 21, a pair of guide rails 202b is fixedly attached to the frame 202 as spaced apart from each other over a predetermined distance in the center reference line G and extending in the transverse direction normal to the center reference line G of the present examining system 201. A generally square shaped base plate 211 is mounted on the guide rails 202b to be movable in the transverse direction. As is apparent from FIG. 21, an L-shaped arm 211a is fixedly attached to the base plate 211 and the L-shaped arm 211a is connected to the corresponding equalizer 205 or 206 of the present system 210 as described previously. A center shaft 213 is rotatably mounted on the base plate 211 at its center through a pair of bearings 212 with its rotating axis directed in the vertical direction. The rotating axis of the center shaft 213 defines the so-called geometrical center of the wheel examining apparatus 210, and the rotating axes of the center shafts 213 of the left and right wheel examining apparatuses 210 are insured to be always located symmetrically in the transverse direction with respect to the center reference line G of the present system 201 through the corresponding equalizer 205 or 206. Furthermore, as will be described later, the center of the wheel W when clamped by the rollers 220 is aligned with the rotating axis of the center shaft 213.

A balance plate 214 elongated in shape is disposed above the base plate 211 at a predetermined height and the balance plate 214 is rotatable around the center shaft 213 in a horizontal plane. Preferably, the center position of the balance plate 214 is aligned with the rotating axis of the center shaft 213. A pair of slit guide rails 214a is fixedly attached to the top surface of the balance plate 214 as spaced apart from each other and aligned in a line in the transverse direction with inner and outer slider members 216a and 217a being slidably mounted on the respective guide rails 214a. Thus, the inner and outer roller assemblies 216 and 217 may move closer together or separated away from each other in the longitudinal direction of the elongated balance plate 214 as guided by the guide rails 214a laid on the balance plate 214 in a line. In this case, since the balance plate 214 is rotatable around the center shaft 213, the direction of movement of each of the roller assemblies 216 and 217 is determined by the rotational position of the balance plate 214 around the center shaft 213 and thus it is not always limited to the direction normal to the center reference line G.

Moreover, there is also provided a link mechanism 215 for operatively interconnecting the inner slider member 216a and the outer slider member 217a. The link mechanism 215 includes a rotating lever 215a mounted on the center shaft 213 to be rotatable around the center shaft 213 with its rotating axis as the center and a pair of interconnection levers 215b which are pivotally connected to the opposite ends of the rotating lever 215a. And, these interconnection levers 215b are pivotally connected to the respective inner and outer slider members 216a and 217a. Thus, the inner and outer slider members 216a and 217a are maintained to be always located symmetrically in the longitudinal direction of the balance plate 214 with respect to the rotating axis of the center shaft 213.

The wheel examining apparatus 210 also includes a cylinder actuator 218 comprising a cylinder unit 218b and a rod 218a which may move out of or into the cylinder unit 218b. The cylinder unit 218b has a base portion 218c which is coupled to the outer slider member 217a and the rod 218a has a forward end 218d which is coupled to the inner slider member 216a. Thus, the rod 218a projects or retracts when the cylinder actuator 218 is operated, whereby the inner and outer slider members 216a and 217a move closer together or separated away from each other in the longitudinal direction of the balance plate 214. In this case, as described previously, since the inner and outer slider members 216a and 217a are operatively coupled through the link mechanism 215, the inner and outer slider members 216a and 217a are always insured to be located symmetrically in the longitudinal direction of the balance plate 214 with respect to the rotating axis of the center shaft 213, i.e., the geometrical center of the wheel examining apparatus 210. In this manner, when the rod 218a is retracted into the cylinder unit 218b by operating the cylinder actuator 218, the inner and outer slider members 216a and 217a are moved closer together and thus the inner and outer rollers 220ti and 220to mounted on these inner and outer slider members 216a and 217a are also moved closer together to thereby clamp the wheel W located therebetween from both sides.

As described before, the center shaft 213 is rotatably supported on the base plate 211 to be rotatably around a predetermined vertical axis, and a disc 223 to which a sector gear 223a is fixedly attached is fixedly attached to the bottom end of the center shaft 213. A shaft 211b is planted at a predetermined position of the base plate 211 and a bracket 225 is rotatably mounted on the shaft 211b through a pair of bearings 224. Thus, the bracket 225 is rotatable at a position above the base plate 211 and around the shaft 211b. In addition, an angle detector (preferably, a rotary encoder) 226 is fixedly attached to the bracket 225. Furthermore, a gear 226a is fixedly attached to the rotating shaft of the angle detector 226 and the gear 226a is in mesh with the above-described sector gear 223a. Thus, any angular displacement of the center shaft 213 on the base plate 211 can be detected by the angle detector 226 through the disc 223, sector gear 223a and gear 226a. Furthermore, a spring 227 extends between a predetermined position of the bracket 225 and a predetermined position of the base plate 211 so that the bracket 225 is given a tendency to rotate around the shaft 211b in the clockwise direction in FIG. 21. Thus, the gear 226a is normally urged to be meshed with the sector gear 223a due to the recovery force of the spring 227, so that it is insured to always maintain a mesh condition in a predetermined direction. As a result, although the center shaft 213, which is an object to be measured, and the detector 226 are interconnected through a gear mesh, any angular displacement of the center shaft 213 can be detected accurately at all times without being adversely affected by backlash. In this manner, since the angle detector 226 is not directly coupled to the center shaft 213, an object to be measured, the size of the overall apparatus in the vertical direction may be minimized and there is also provided an increased degree of freedom in designing a layout, such as arrangement of parts.

In the illustrated example, the angle detector 226 and the center shaft 213 are separately provided. In an alternative embodiment, the angle detector 226 may also be directly mounted on the center shaft 213. The angle detector 226 directly detects an angular displacement of the center shaft 213. However, when the cylinder actuator 218 is operated to clamp the wheel W by the rollers 220 from both sides, the orientation of the rollers 220 is determined in accordance with the direction or inclination of the wheel W, whereby the balance plate 214 is rotated by the roller assemblies 216 and 217 and thus the center shaft 213 fixedly attached to the balance plate 214 is also rotated so that its angular displacement of the center shaft 213 is detected by the angle detector 226. Accordingly, in effect, the angle detector 226 in the illustrated example detects the toe angle of the wheel W.

The wheel examining apparatus 210 also includes a support plate 230 which is fixedly attached to the frame 202 and which is disposed above the center shaft 213 and its surrounding components. A plurality of balls 231 are provided on the support plate 230 and a floating plate 232 is placed on the plurality of balls 231. The floating plate 232 has a flat top support surface for supporting thereon a wheel W to be examined. It is to be noted that the floating plate 231 is not only freely translationally movable in a horizontal plate but also freely rotatable in the horizontal plane relative to the support plate 230 fixedly attached to the frame 202. In the preferred embodiment, the support plate 230 is provided with a retainer for retaining the plurality of balls 231 in a predetermined position.

Referring now to FIGS. 22 through 24, a camber detecting device provided in the present wheel examining apparatus 201 will be described in detail. In the illustrated embodiment, the camber detecting device is integrally formed with the before-described outer roller assembly 217 and it is to be noted that the camber detecting device is in fact mounted on the horizontal bracket 217c of the outer roller assembly 217. As shown in FIGS. 22 through 24, a pair of side walls 235 is fixedly provided on the top surface of the horizontal bracket 217c as spaced apart from each other over a predetermined distance and a sensor shaft 236 is provided as extending horizontally between these side walls 235. The sensor shaft 236 is rotatably supported by these side walls 235 through a pair of bearings 236a. Furthermore, a pair of inclined brackets 237 is fixedly attached one at each end of the sensor shaft 236, and these inclined brackets 237 rotatably hold respective toe-detecting outer rollers 220to as inclined through respective roller holders 237a. A sensor arm 238 fixedly attached to the center portion of the sensor shaft 236 extends substantially vertically upward. A camber detecting roller 220c is rotatably mounted at the tip end of the sensor arm 238 through a roller holder 238a. This roller 220c is held to be rotatable around a shaft 222, which is fixedly attached to the roller holder 238a, through a pair of bearings 221. The shaft 222 extends in parallel with the longitudinal axis of the sensor arm 238 so that the camber detecting roller 220c is normally maintained in vertical orientation.

In the illustrated embodiment, the pair of toe-detecting outer rollers 220to, which are to be brought into rolling contact with the lower portion of the tire of a wheel W, and the camber detecting roller 220c, which is to be brought into rolling contact with the upper portion of the tire of the wheel W, are supported by an integrally structured roller assembly which includes the sensor shaft 236, inclined brackets 237 and sensor arm 238. In the illustrated embodiment, the vertical distance from the rotating axis of the sensor shaft 236 to a contact point between the camber detecting roller 220c and the tire of the wheel W is preferably set to be approximately three times of the vertical distance from the rotating axis of the sensor shaft 236 to a contact point between the toe-detecting roller 220to and the tire of the wheel W. With this preferred structure, each of the rollers 220c and 220to comes into rolling contact with the tire of the wheel W with high stability and enhanced balance.

Another shaft 240 also extends between the pair of side walls 235 fixedly attached to the horizontal bracket 217c, and the shaft 240 is rotatably supported at the side walls 235 through a pair of bearings 240a. A bracket 241 is fixedly attached to the central portion of the shaft 240 and an angle detector 242, preferably a rotary encoder, is fixedly attached to the bracket 241. The angle detector 242 has a rotating shaft to which a gear 242a is fixedly attached. Another bracket 243 is fixedly attached to the sensor shaft 236 and a sector gear 243a is fixedly attached at the distal end of the bracket 243. And, the sector gear 243a is maintained to be in mesh with the gear 242a of the before-mentioned angle detector 242, so that any angular displacement of the sensor shaft 236 may be detected by the angle detector 242. Also in this case, since the angle detector 242 is not directly attached to the sensor shaft 236, which is an object to be detected, there is provided an increased degree of freedom in designing a layout. A spring 244 is provided to extend between the bracket 241 and the horizontal bracket 217c so that the bracket 241 is always given a tendency to rotate around the shaft 240 in a predetermined direction. That is, due to the recovery force of the spring 244, the mesh between the sector gear 243a and the gear 242a is always maintained in a predetermined direction to thereby allow to eliminate any adverse effect from backlash.

A post 217d is planted upright at the base portion of the horizonal bracket 217c and a spring 239 is provided to extend between the top end of the post 217d and a predetermined location of the sensor arm 238 in the vicinity of its base portion. This spring 239 serves to maintain the sensor arm 238 slightly inclined outwardly with its top end located slightly outside when not in operation so that the top end of the sensor arm 238 or the detector roller 220c is prevented from coming into contact with the body of a vehicle to be examined when the vehicle is moved into the present examining system 201. It is to be noted that if the sensor arm 238 may take such a posture by itself when not in operation, the spring 239 may be discarded.

Figure 25:
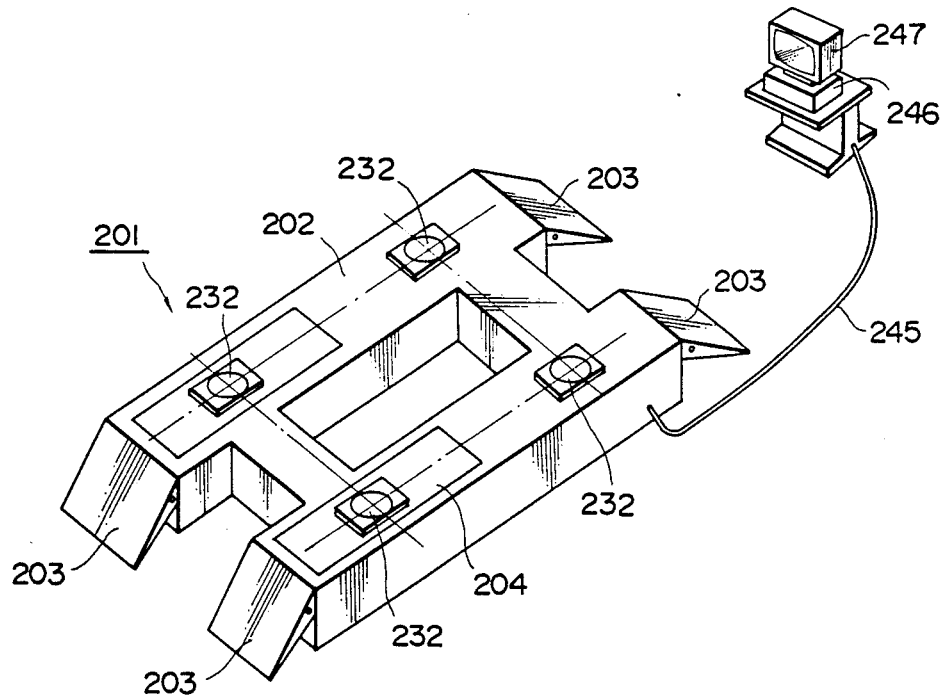
FIG. 25 is a schematic illustration showing a condition in which the wheel examining system 201 is operatively coupled to a display device.

FIG. 25 illustrates an example in which the present wheel examining system 201 is connected to a display unit. The wheel examining system 201 is provided for example by installing its frame 202 on the ground or the floor of an examination site and placing a pair of ramps 203 one at each end of the frame 202 to thereby allow a vehicle to be examined to move into the present wheel examining system 201 from one end and move out of the system 201 from the opposite end. Four wheel examining apparatuses 210 are mounted on the frame 202 at four front and rear and right and left locations which are represented by the floating tables 232 in FIG. 25. As described previously, the front pair of floating tables 232 is mounted on the movable front base 204. Each of the four wheel examining apparatuses 210 is electrically connected to a process unit 246, which includes a CPU or the like, through a cable 245. Thus, various data, such as inclination data, obtained by each of the wheel examining apparatuses 210 is supplied to the process unit 246 where the data is processed in accordance with a predetermined program with its result being displayed at the screen of a CRT display unit 247. If desires, a printer may also be connected to the process unit 246 to thereby obtain a hard copy of the processed result. In addition, a keyboard or any other input device may also be connected to the process unit 246 so as to supply desired information, such as the identification number of a vehicle being examined. In this manner, in accordance with the present wheel examining system, the examination of wheels of a vehicle can be carried out speedily and accurately in a near complete automatic mode.

Figure 26:
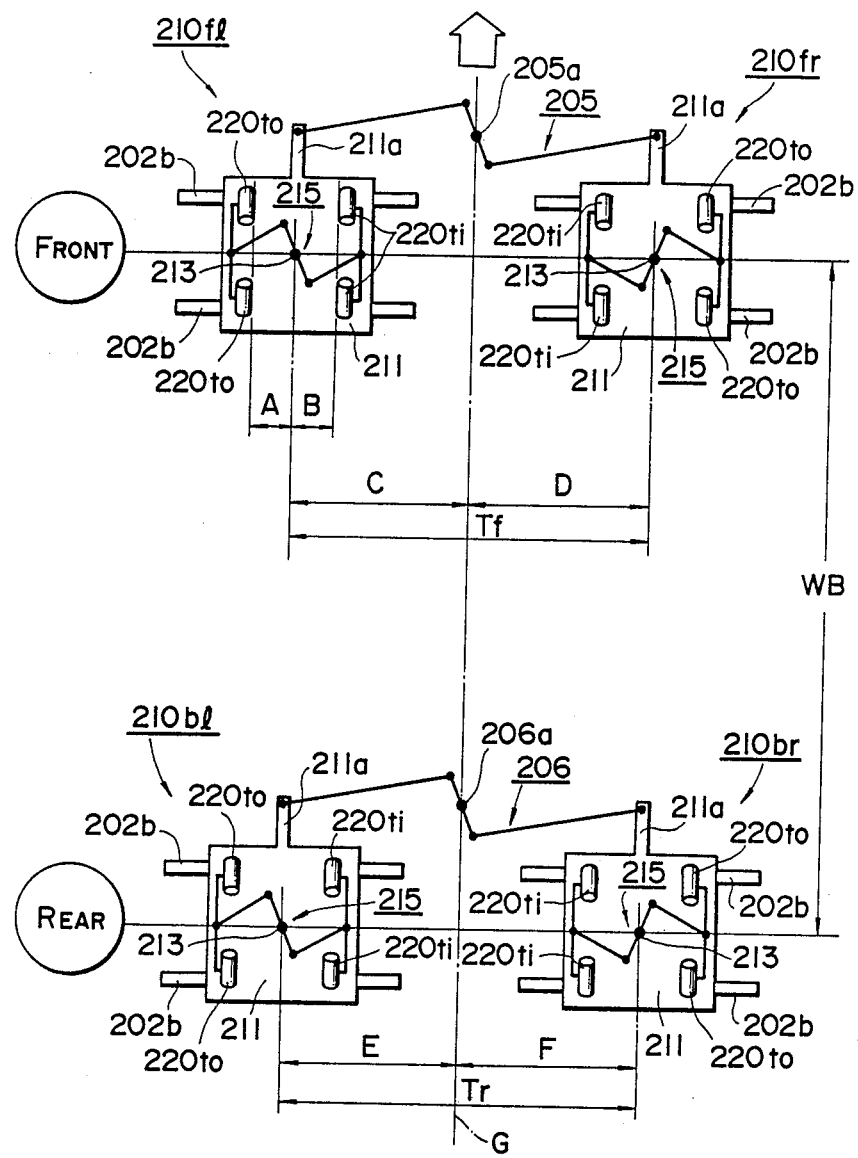
FIGS. 26 through 28 are schematic illustrations which are useful for understanding the operational principle of the wheel examining system 201.
Figure 27:
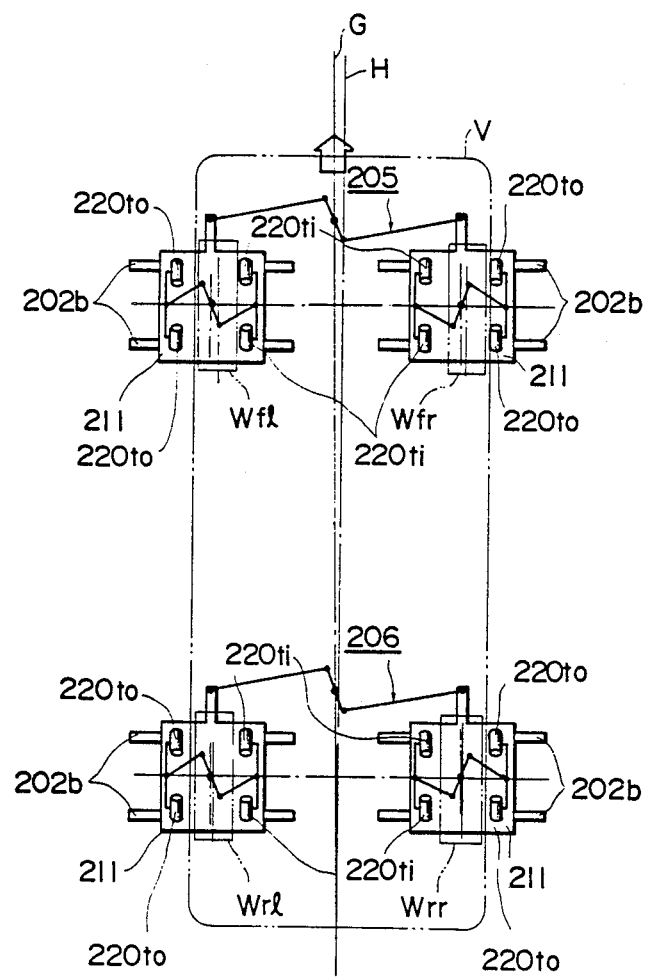
Figure 28:
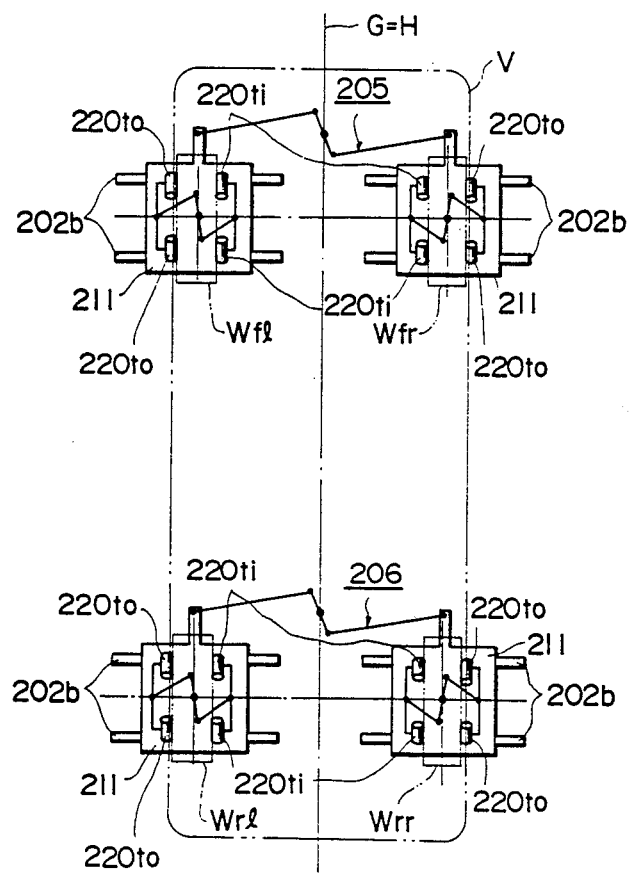

Referring now to FIGS. 26 through 28, the operation of the present wheel examining system 201 will be described. As shown in FIG. 26, the present wheel examining system 201 includes the front and rear equalizers 205 and 206 and an imaginary straight line connecting the centers of these front and rear equalizers 205 and 206 defines the center reference line G of the present system 201. As described previously, the front pair of wheel examining apparatuses 210fr 21fl is regulated in movement in the transverse direction normal to the center reference line G by the front equalizer 205 and they are always insured to be located symmetrically in the transverse direction with respect to the center reference line G. This also holds true for the rear pair of wheel examining apparatuses 210br and 210bl which are operatively interconnected by the rear equalizer 206. Accordingly, the distance C between the center shaft 213 of the front left wheel examining apparatus 210fl and the center reference line G is always maintained to be equal to the distance D between the center shaft 213 of the front right wheel examining apparatus 210fr and the center reference line G. As will be described later, under the condition in which wheels W are clamped, a sum of C and D, i.e., C+D, is equal to the front wheel tread Tf, i.e., center-to-center distance between the two front wheels, of a vehicle being examined. The same holds true also for the pair of rear wheels, and thus the distances E and F from the respective center shafts 213 of the left and right rear wheel examining apparatuses 210bl and 210br to the center reference line G are the same, so that a sum of E and F, i.e., E+F, is equal to the rear wheel tread Tr, i.e., center-to-center distance between the two rear wheels.

In each of the wheel examining apparatuses 210, the inner and outer rollers 220ti and 220to are provided to be movable symmetrically in the lateral direction with respect to the center shaft 213 which is rotatably supported on the base plate 211. These rollers 220ti and 220to may also rotate around the center shaft 213 together therewith. FIG. 26 illustrates the condition in which the center shaft 213 has not been rotated, in which case all of the inner and outer rollers 220ti and 220to are arranged in parallel with the center reference line G.

FIG. 27 illustrates the condition in which the present wheel examining system 201 is in its stand-by state and a vehicle V to be examined has just been moved into the system 201. In this case, defining the center line H of the vehicle V as a straight line connecting the centers of the front and rear wheel treads, immediately after the vehicle V has been moved into the present system 201, the vehicle center line H does not always agree with the center reference line G of the present system 201. In the condition shown in FIG. 27, the inner and outer rollers 220ti and 220to are separated away from each other in each of the wheel examining apparatuses 210 and thus the wheels of the vehicle V may be easily located in the respective wheel examining apparatuses 210. Upon completion of loading of the vehicle V in position, the present system 201 is activated so that the inner and outer rollers 220ti and 220to in each of the wheel examining apparatuses 210 are moved closer together to finally clamp the corresponding wheel W. Since each of the wheels W is supported on the corresponding floating table 232, when the wheels W are clamped, the wheels W are moved such that the center of each of the wheels W comes to be aligned with the center shaft 213 of the corresponding wheel examining apparatus 210. Besides, since such a lateral motion of each of the front or rear wheels W is interconnected by the corresponding equalizer 205 or 206, each pair of the front and rear wheels W comes to be positioned symmetrically in the transverse direction with respect to the center reference line G. The resulting condition (i.e., G=H) is shown in FIG. 28. In FIG. 28, each of the wheels W is shown to be in parallel with the center reference line G; however, in particular for the front wheels H, the wheels H should be shown to be inclined with respect to the center reference line G since a predetermined toe is normally set for the front wheels W. The rear wheels W should also be shown to be inclined with respect to the center reference line G if a toe is set in the rear wheels W. Under this condition, various parameters of a wheel, such as inclination parameters including the toe and camber, can be detected at high accuracy.

FIG. 29 schematically shows in perspective view a wheel examining apparatus 210' constructed in accordance with a still further embodiment of the present invention. The apparatus shown in FIG. 29 is similar in structure in many respects to the previously described wheel examining apparatus 210, and thus like elements are indicated by like numerals. The present apparatus 210' differs from the previous apparatus 210 in that a sensor arm 238 is provided to be pivotal around a sensor shaft 236 and also a cylinder actuator 249 is provided as operatively coupled to the sensor arm 238. That is, in the previously described apparatus 210, the pair of toe detecting rollers 220to and the camber detecting roller 220c are supported by an integral roller assembly and it is so structured that these rollers 220to and 220c automatically come into contact with the corresponding side surface of the wheel W when moved closer thereto. On the other hand, in the present apparatus 201', the camber detecting roller 220c and the toe detecting rollers 220to are provided functionally separately and the camber detecting roller 220c is independently operated by the cylinder actuator 237. In the illustrated embodiment, there is provided a horizontal lever 248 which is pivotal around the sensor shaft 236 and which may be carried on the horizontal bracket 217c and the cylinder actuator 249 has both ends connected to the distal end of the horizontal lever 248 and the sensor arm 238.

FIGS. 30 and 31 illustrate a modification of the previously described wheel examining apparatus 210. That is, in the previously described wheel examining apparatus 210, the wheel W to be examined is placed on the top flat support surface of the floating table 232 and thus the examination of the wheel H is carried out with the wheel W unrotating or stationary. On the other hand, in the modified wheel examining apparatus shown in FIGS. 30 and 31, provision is made of a pair of rotatable support rollers in place of the floating table 232 and a wheel W to be examined is supported on these support rollers. As a result, in this modified structure, the wheel W can be examined while keeping it in rotation.

The rotating type wheel examination apparatus shown in FIGS. 30 and 31 is similar in many respects in structure to the unrotating type wheel examination apparatus shown in FIGS. 19 through 20. However, the apparatus shown in FIGS. 30 and 31 differs in the provision of a pair of support rollers 252 in place of the floating table having a flat top support surface. The other structure remains the same. In the structure shown in FIGS. 30 and 31, a pair of opposite projections 202c is formed in the frame 202 and a roller block 251 is placed on the pair of opposite projections 202c with a ball assembly 250 sandwiched therebetween. The ball assembly 250 is comprised of a plurality of balls 250a and a retainer 250b for retaining the plurality of balls 250a in a predetermined arrangement. Accordingly, the roller block 250 is movable translationally as well as rotationally in a horizontal plane within predetermined limits by means of the balls 250a.

The roller block 251 is generally rectangular in shape and its central portion is removed to define a recess or a through-hole in which a pair of support rollers 252 is arranged in parallel and spaced apart from each other over a predetermined distance. For example, each of the support rollers 252 is rotatably supported by a bearing 251a at each end. In the illustrated embodiment, an armature 252 is disposed inside of at least one of the support rollers 252, and thus that support roller 252 has a motor structure with the support roller 252 defined as a rotor and the armature 252a defined as a stator. Accordingly, by activating the support roller 252 having such a motor structure, the support roller 252 is driven to rotate in a predetermined direction so that the wheel W supported on the support rollers 252 is caused to rotate in a predetermined direction. In this case, as described previously, when use is made of rollers 220 as contact members which are brought into contact with the opposite side surfaces of the wheel W in order to detect the toe and camber of the wheel W, no problem arises even if the wheel W is driven to rotate in this manner. If the wheel W is examined while it is kept in rotation in this manner, the dynamic performance of the wheel W simulating a real running condition of a vehicle can be examined and additional parameters, such as amount of wiggling of a wheel W and steering performance of a wheel W, can also be examined.

In the above-described wheel rotating type embodiment, the armature 252a is disposed inside of the support roller 252 to cause the support roller 252 to rotate. Alternatively, without providing the armature 252a inside of the support roller 252, it may be so structured that the support roller 252 is driven to rotate by an external driving source, such as a motor, through a coupling or belt while providing the support roller 252 to be freely rotatable around its own axis. As another alternative structure, the support rollers 252 may be provided to be freely rotatable around their own axes and the wheel W supported on the support rollers 252 may be driven to rotate by an engine of the vehicle. The apparatus shown in FIGS. 30 and 31 may be realized simply by relacing the wheel supporting structure of the apparatus shown in FIGS. 16 through 24, and thus the apparatus shown in FIGS. 16 through 24 may be upgraded extremely easily.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A roller clamp type wheel examining apparatus, comprising:
    supporting means having a flat support surface for supporting thereon a wheel of a vehicle;
    a plurality of rollers for clamping both sides of said wheel supported on said supporting means, said plurality of rollers being so arranged to be brought into rolling contact with the bottom half portion of said wheel such that each of said plurality of rollers has a rotating axis extending generally in the radial direction of said wheel when brought into contact therewith; and angle detecting means for detecting a relative angle defined between said wheel and a predetermined reference line with said wheel clamped by said plurality of rollers.

2. The apparatus of claim 1 wherein said supporting means includes a floating table provided with said flat support surface.

3. The apparatus of claim 2 wherein said floating table is freely movable translationally as well as rotationally in a predetermined plane.

4. The apparatus of claim 1 wherein said plurality of rollers include two pairs of rollers each of which may be brought into rolling contact with a corresponding one of the opposite sides of said wheel.

5. The apparatus of claim 1 wherein said angle detecting means detects a toe angle of said wheel.

6. An apparatus for detecting a camber angle of a wheel of a vehicle, comprising:
    at least one upper contact member which is operable to be brought into contact with an upper portion of one side of a wheel;
    a plurality of lower contact members for clamping both sides of said wheel, said plurality of lower contact members including at least one lower contact member which is operable to be brought into contact with a lower portion of said one side of a wheel;
    an arm carrying thereon said at least one upper contact member and said at least one lower contact member;
    supporting means for pivotally supporting said arm such that said upper and lower contact members are operable to be brought into contact with or moved away from said one side of a wheel; and
    angle detecting means for detecting an angle defined between said arm and a predetermined reference line.

7. The apparatus of claim 6 wherein two of said lower contact members are provided to be brought into contact with said one side of a wheel as spaced apart from each other in a circumferential direction of said wheel.

8. The apparatus of claim 6 wherein said upper and lower contact members are brought into contact with upper and lower portions of a tire of said wheel, respectively.

9. The apparatus of claim 6 wherein a vertical distance between a contact point between said upper contact member and said one side of a wheel and a pivotal axis of said arm is approximately three times of a vertical distance between a contact point between said lower contact member and said one side of a wheel and said pivotal axis of said arm.

10. The apparatus of claim 6 wherein said lower contact members also serve to detect a toe angle of said wheel when said lower clamping members clamp both sides of said wheel.

11. The apparatus of claim 6 wherein said upper and lower contact members are rollers.

12. A wheel examining apparatus for examining a wheel of a vehicle, comprising:
supporting means for supporting thereon a wheel of a vehicle to be examined;
clamping means for clamping both sides of said wheel to thereby bring a geometrical center of said wheel in alignment with a predetermined center of said clamping means; and
detecting means for detecting a predetermined angle of said wheel supported by said supporting means and clamped by said clamping means, said detecting means including:
a rotating shaft rotatably supported in said apparatus;
a first gear fixedly attached to said rotating shaft;
a carrier pivotally supported in said apparatus;
an angle detector fixedly attached to said carrier;
a second gear fixedly attached to a rotating shaft of said angle detector; and
urging means for urging said carrier to pivot in a predetermined direction to thereby maintain a mesh between said first and second gears in a predetermined direction.

13. The apparatus of claim 12 wherein said urging means includes a spring extended between said carrier and said object.

14. The apparatus of claim 12 wherein said angle detector is a rotary encoder.

15. The apparatus of claim 12 therein said angle detector detects a toe angle of said wheel of a vehicle.

16. The apparatus of claim 12 wherein said angle detector detects a camber angle of said wheel.

* * * * *